US012615619B2

(12) United States Patent
Liberg et al.

(10) Patent No.: US 12,615,619 B2
(45) Date of Patent: Apr. 28, 2026

(54) ACCESS OFFSET DETERMINATION IN CONJUNCTION WITH PAGING IN NON-TERRESTRIAL NETWORKS

(71) Applicant: Telefonaktiebolaget LM Ericsson (publ), Stockholm (SE)

(72) Inventors: Olof Liberg, Enskede (SE); Stefan Eriksson Löwenmark, Färentuna (SE); Sebastian Euler, Storvreta (SE); Emre Yavuz, Stockholm (SE); Johan Rune, Lidingö (SE); Talha Khan, Santa Clara, CA (US); Helka-Liina Määttänen, Espoo (FI); Zhipeng Lin, Nanjing Jiangsu (CN); Xingqin Lin, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 361 days.

(21) Appl. No.: 18/032,308

(22) PCT Filed: Oct. 22, 2021

(86) PCT No.: PCT/IB2021/059783
§ 371 (c)(1),
(2) Date: Apr. 17, 2023

(87) PCT Pub. No.: WO2022/084958
PCT Pub. Date: Apr. 28, 2022

(65) Prior Publication Data
US 2023/0397161 A1      Dec. 7, 2023

(30) Foreign Application Priority Data

Oct. 22, 2020      (WO) ................ PCT/CN2020/122639

(51) Int. Cl.
*H04W 68/02* (2009.01)
*H04B 7/185* (2006.01)
*H04W 84/06* (2009.01)

(52) U.S. Cl.
CPC ........ *H04W 68/02* (2013.01); *H04B 7/18545* (2013.01); *H04W 84/06* (2013.01)

(58) Field of Classification Search
CPC . H04W 68/02; H04W 84/06; H04W 56/0045; H04B 7/18545; H04B 7/18563
See application file for complete search history.

(56) References Cited

U.S. PATENT DOCUMENTS

| | | | |
|---|---|---|---|
| 2019/0104498 A1 | 4/2019 | Jung et al. | |
| 2022/0104084 A1* | 3/2022 | Liberg | ................. H04W 60/04 |
| 2022/0417889 A1* | 12/2022 | Liberg | ................ H04W 56/002 |

FOREIGN PATENT DOCUMENTS

| | | |
|---|---|---|
| CN | 110167087 A | 8/2019 |
| WO | 2017158440 A1 | 9/2017 |

(Continued)

OTHER PUBLICATIONS

3rd Generation Partnership Project; Technical Specification Group Radio Access Network; Study on New Radio (NR) to support non-terrestrial networks (Release 15) 3GPP TR 38.811 V15.4.0 (Sep. 2020) 127 pages.

(Continued)

*Primary Examiner* — Siu M Lee
(74) *Attorney, Agent, or Firm* — Sage Patent Group

(57) ABSTRACT

A communication device can be configured to operate in a non-terrestrial network that includes a network node communicatively coupled to the communication device via a satellite. The communication device can determine when to perform an access offset determination ("AOD") relative to a paging occasion ("PO").

19 Claims, 13 Drawing Sheets

Determine when to perform an access offset determination relative to a paging occasion

1110

Communicate information associated with the AOD to the network node

1120

(56) References Cited

FOREIGN PATENT DOCUMENTS

| WO | WO-2020162806 A2 * | 8/2020 | ............ G01S 19/14 |
| WO | 2020185949 A2 | 9/2020 | |
| WO | 2021028850 A1 | 2/2021 | |
| WO | 2021028853 A1 | 2/2021 | |
| WO | 1332392021 A1 | 7/2021 | |
| WO | 2021133239 A1 | 7/2021 | |

OTHER PUBLICATIONS

3rd Generation Partnership Project; Technical Specification Group Radio Access Network; Solutions for NR to support non-terrestrial networks (NTN) (Release 16) 3GPP TR 38.821 V16.0.0 (Dec. 2019) 140 pages.

3rd Generation Partnership Project; Technical Specification Group Radio Access Network; NR; User Equipment (UE) procedures in Idle mode and RRC Inactive state (Release 16) 3GPP TS 38.304 V16.2.0 (Sep. 2020) 39 pages.

"Solutions for NR to support non-terrestrial networks (NTN)," 3GPP TSG RAN meeting #86, Sitges, Spain, Dec. 9-13, 2019, RP-193234, Thales, 10 pages.

"New Study WID on NB-IoT/eTMC support for NTN," 3GPP TSG RAN meeting #86, Sitges, Spain, Dec. 9-13, 2019, RP-193235, MediaTek Inc., 4 pages.

Notice of Reasons for Rejection, Japanese Patent Application No. 2023-524868, mailed May 28, 2024, 10 pages.

"UL Time and Frequency Synchronisation for NR-NTN," 3GPP TSG RAN WG1 Meeting #102e, R1-2005496, Aug. 24-28, 2020, Agenda Item 8.4.2, MediaTek, Eutelsat, 16 pages.

"On UL Time and Frequency Synchronization Enhancements for NTN," 3GPP TSG RAN WG1 Meeting #103e, R1-2009092, e-Meeting, Oct. 26-Nov. 13, 2020, Agenda Item 8.4.2, Ericsson, 15 pages.

International Search Report and Written Opinion of the International Searching Authority, PCT/IB2021/059783, mailed Jan. 14, 2022, 13 pages.

International Search Report and Written Opinion of the International Searching Authority, PCT/CN2020/122639, mailed Jul. 28, 2021, 8 pages.

3GPP TSG-RAN WG2 #106, Tdoc R2-1908243, Reno, NV, US, May 13-17, 2019, Ericsson, et al., "Paging Capacity for NTN," 8 pages.

3GPP TSG-RAN WG2 #104, R2-1816447, Spokane, WA, US, Nov. 12-16, 2018, LG Electronics Inc., 'Discussion on the Issue for Paging in NTN, 5 pages.

3GPP TR 38.821 V0.8.0 (Sep. 2019); 3rd Generation Partnership Project; Technical Specification Group Radio Access Network; Solutions for NR to support non-terrestrial networks (NTN) (Release 16) 91 pages.

* cited by examiner

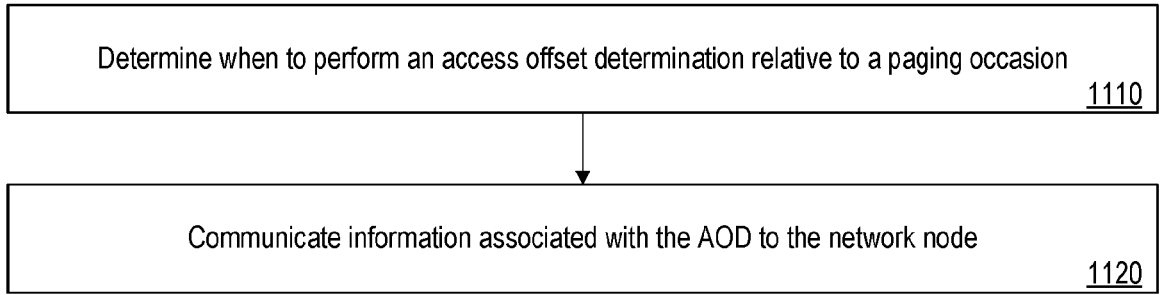

Determine when to perform an access offset determination relative to a paging occasion
1110

Communicate information associated with the AOD to the network node
1120

FIG. 11

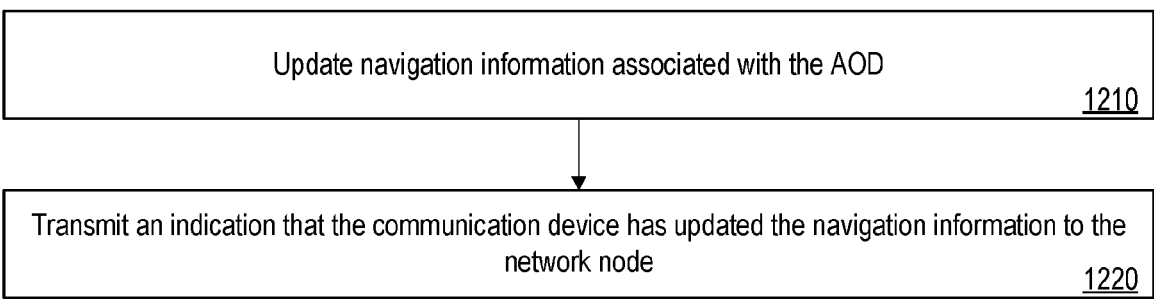

Update navigation information associated with the AOD
1210

Transmit an indication that the communication device has updated the navigation information to the network node
1220

FIG. 12

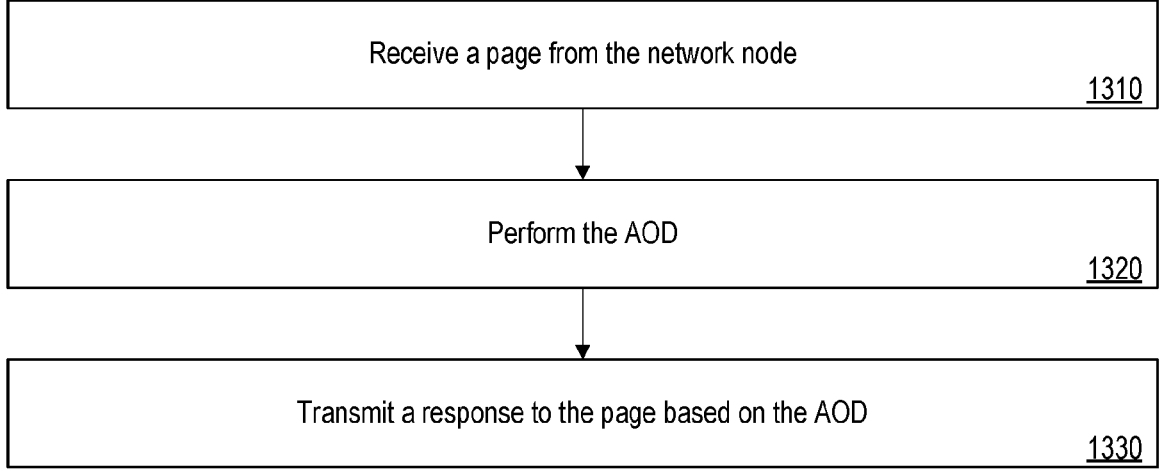

Receive a page from the network node
1310

Perform the AOD
1320

Transmit a response to the page based on the AOD
1330

FIG. 13

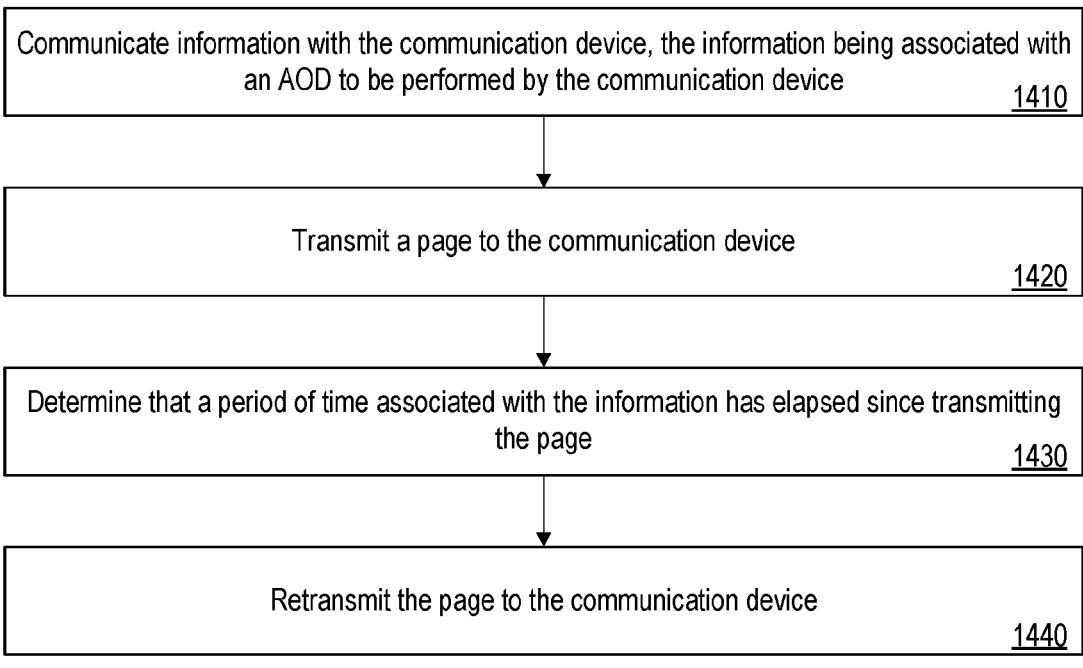

Communicate information with the communication device, the information being associated with an AOD to be performed by the communication device
1410

Transmit a page to the communication device
1420

Determine that a period of time associated with the information has elapsed since transmitting the page
1430

Retransmit the page to the communication device
1440

FIG. 14

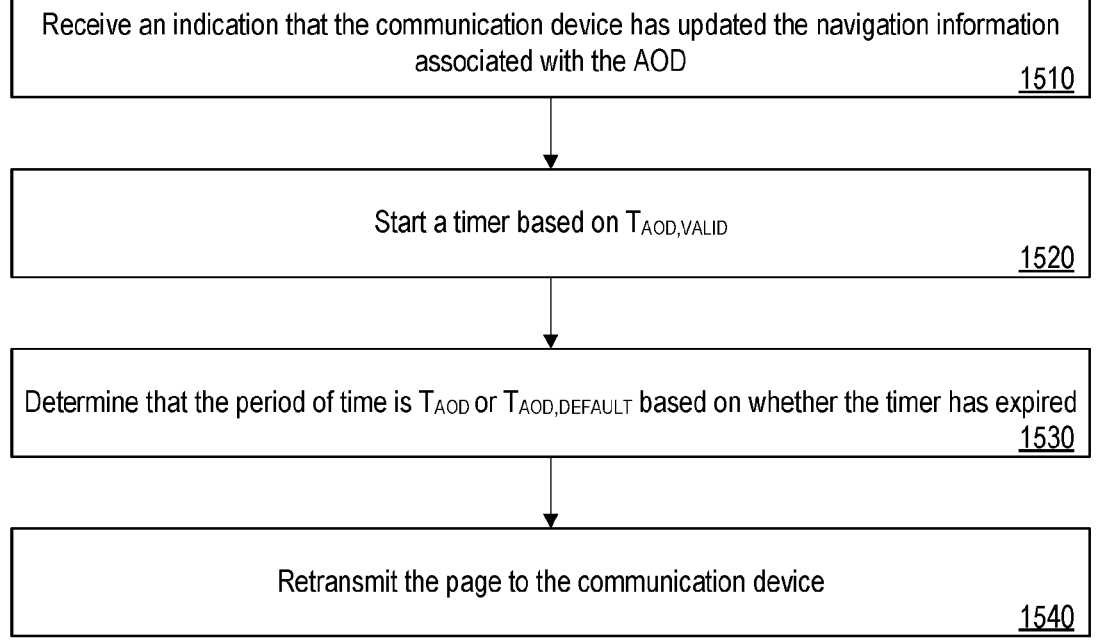

Receive an indication that the communication device has updated the navigation information associated with the AOD
1510

Start a timer based on $T_{AOD,VALID}$
1520

Determine that the period of time is $T_{AOD}$ or $T_{AOD,DEFAULT}$ based on whether the timer has expired
1530

Retransmit the page to the communication device
1540

FIG. 15

ACCESS OFFSET DETERMINATION IN CONJUNCTION WITH PAGING IN NON-TERRESTRIAL NETWORKS

CROSS REFERENCE TO RELATED APPLICATIONS

This application is a 35 U.S.C. § 371 national stage application of PCT International Application No. PCT/IB2021/059783 filed on Oct. 22, 2021, which in turn claims foreign priority to International Patent Application No. PCT/CN2020/122639, filed on Oct. 22, 2020, the disclosures and content of which are incorporated by reference herein in their entirety.

TECHNICAL FIELD

The present disclosure relates generally to communication, and more particularly to accessing offset determination in conjunction with paging in non-terrestrial networks ("NTNs").

BACKGROUND

In $3^{rd}$ generation partnership project ("3GPP") Release 8, the evolved packet system ("EPS") was specified. EPS is based on the long-term evolution ("LTE") radio network and the evolved packet core ("EPC"). The EPS was originally intended to provide voice and mobile broadband ("MBB") services but has continuously evolved to broaden its functionality. Since Release 13, narrowband-internet of things ("NB-IoT") and LTE for machines ("LTE-M") are part of the LTE specifications and provide connectivity to massive machine type communications ("mMTC") services.

In 3GPP Release 15, the first release of the 5th generations system ("5GS") was specified. The 5GS is a new generation's radio access technology intended to serve use cases such as enhanced mobile broadband ("eMBB"), ultra-reliable and low latency communication ("URLLC"), and mMTC. 5G includes the new radio ("NR") access stratum interface and the 5G Core Network ("5GC"). The NR physical and higher layers can reuse parts of the LTE specification, and add needed components when motivated by the new use cases. One such component is the introduction of a sophisticated framework for beam forming and beam management to extend the support of the 3GPP technologies to a frequency range going beyond 6 GHz.

In Release 15, 3GPP started the work to prepare NR for operation in a non-terrestrial network ("NTN"). The work was performed within the study item "NR to support Non-Terrestrial Networks." In Release 16, the work to prepare NR for operation in an NTN network continued with the study item "Solutions for NR to support Non-Terrestrial Network." In parallel, the interest to adapt NB-IoT and LTE-M for operation in NTN is growing. As a consequence, 3GPP Release 17 includes both a work item on NR NTN and a study item on NB-IoT and LTE-M support for NTN.

There is an ongoing resurgence of satellite communications. Several plans for satellite networks have been announced in the past few years. The target services for these satellite networks vary, from backhaul and fixed wireless, to transportation, to outdoor mobile, to internet of things ("IoT"). Satellite networks could complement mobile networks on the ground by providing connectivity to underserved areas and multicast/broadcast services.

To benefit from the strong mobile ecosystem and economy of scale, adapting the terrestrial wireless access technologies including LTE and new radio access technology ("NR") for satellite networks is drawing significant interest. For example, the third-generation partnership project ("3GPP") completed an initial study in Release 15 on adapting NR to support non-terrestrial networks (mainly satellite networks). This initial study focused on the channel model for the non-terrestrial networks, defining deployment scenarios, and identifying the key potential impacts. 3GPP is conducted a follow-up study item in Release 16 on solutions evaluation for NR to support non-terrestrial networks.

FIG. 1 illustrates an example architecture of a satellite network with bent pipe transponders. A satellite radio access network 100 can include: a gateway 160 that connects a satellite network to a core network; a satellite 150 (e.g., a space-borne platform); a terminal 120 (e.g., a wireless device and/or user equipment ("UE"); a feeder link 140 (e.g., a link between the gateway 160 and the satellite 150); and an access link 130 (sometimes referred to as a service link) (e.g., a link between the satellite 150 and the terminal 120). In this example, the gateway 160 connects to a core network via a base station 170. In additional or alternative examples, the gateway 160 connects to the core network via any suitable network node or includes the network node.

The link from the gateway 160 to terminal 120 is often called a forward link, and the link from the terminal 120 to the gateway 160 is often called a return link. Depending on the functionality of the satellite 150 in the satellite radio access network 100, two transponder options may be considered: a bent pipe transponder and/or a regenerative transponder. When using a Bent pipe transponder, a satellite forwards the received signal back to the earth with only amplification and a shift from uplink frequency to downlink frequency. When using a regenerative transponder, a satellite includes on-board processing to demodulate and decode the received signal and regenerate the signal before sending it back to the earth.

Depending on the orbit altitude, a satellite may be categorized as a low earth orbit ("LEO") satellite, a medium earth orbit ("MEO") satellite, or a geosynchronous earth orbit ("GEO") satellite. A LEO satellite is located at a height ranging from 250-1,500 km, with orbital periods ranging from 90-120 minutes. A MEO satellite is located at a height ranging from 5,000-25,000 km, with orbital periods ranging from 3-15 hours. A GEO satellite is located at a height of 35,786 km, with an orbital period of 24 hours.

A satellite may generate several beams over a given area. The footprint of a beam is usually in an elliptic shape, which has been called a cell. The footprint of a beam is also often referred to as a spotbeam (e.g., spotbeam 110 in FIG. 1). The footprint of a spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Two of the main physical phenomena that affect satellite communications system design are the long propagation delay and Doppler effects. The Doppler effects are especially pronounced for LEO satellites.

Propagation delay is an important aspect of satellite communications that is different from the delay expected in a terrestrial mobile system. For a bent pipe satellite network (e.g., as the satellite radio access network 100 in FIG. 1), the round-trip delay may, due to the orbit height, range from tens of ms in the case of LEO to several hundreds of ms for GEO. This can be compared to the round-trip delays catered for in a cellular network which are limited to 1 ms. The propagation delay may also be highly variable due to the high velocity of the LEO and MEO satellites and change in the order of 10-100 µs every second, depending on the orbit altitude and satellite velocity.

A one-way delay can be a delay from the base station ("BS") to the UE via the satellite, or the other way around. A round-trip delay can be a delay from the BS to the UE via the satellite and from the UE back to the BS via the satellite. A differential delay can be the delay difference of two selected points in the same spotbeam. There may be additional delay between the ground BS antenna and BS, which may or may not be collocated. This delay depends on deployment. If the delay cannot be ignored, it should be taken into account in the communications system design. The propagation delay depends on the length of the signal path, which further depends on the elevation angles of the satellite seen by the BS and UE on the ground. The minimum elevation angle is typically more than 10° for UE and more than 5° for BS on the ground.

A second important aspect closely related to the timing, is a Doppler frequency offset induced by the motion of the satellite. The access link may be exposed to Doppler shift in the order of 10-100 kHz in sub-6 GHz frequency band and proportionally higher in higher frequency bands. Also, the Doppler is varying, with a rate of up to several hundred Hz per second in the S-band and several kHz per second in the Ka-band.

SUMMARY

According to some embodiments, a method of operating a communication device configured to operate in a non-terrestrial network that includes a network node communicatively coupled to the communication device via a satellite is provided. The method can include determining when to perform an access offset determination ("AOD") relative to a paging occasion ("PO"). The method can further include communicating information associated with the AOD to the network node.

According to other embodiments, a method of operating a network node configured to operate in a non-terrestrial network that includes a communication device communicatively coupled to the network node via a satellite is provided. The method can include communicating information with the communication device, the information associated with an access offset determination ("AOD") to be performed by the communication device. The method can further include transmitting a page to the communication device. The method can further include, responsive to transmitting the page, determining that a period of time associated with the information has elapsed since transmitting the page. The method can further include, responsive to determining that the period of time has elapsed, retransmitting the page to the communication device.

According to other embodiments, a network node, a communication device, computer program, and/or computer program product is provided for performing one or more of the above methods.

Various embodiments described herein allow a UE to reduce power consumption by only performing access offset determination (e.g., GNSS measurement) when needed. For example a UE may perform the access offset determination after receiving a paging message addressed to the UE.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 11-13 are flow charts illustrating examples of operations performed by a communication device according to some embodiments of the present disclosure;

FIGS. 14-15 are flow charts illustrating examples of operations performed by a network node according to some embodiments of the present disclosure;

DETAILED DESCRIPTION

Figure 1:
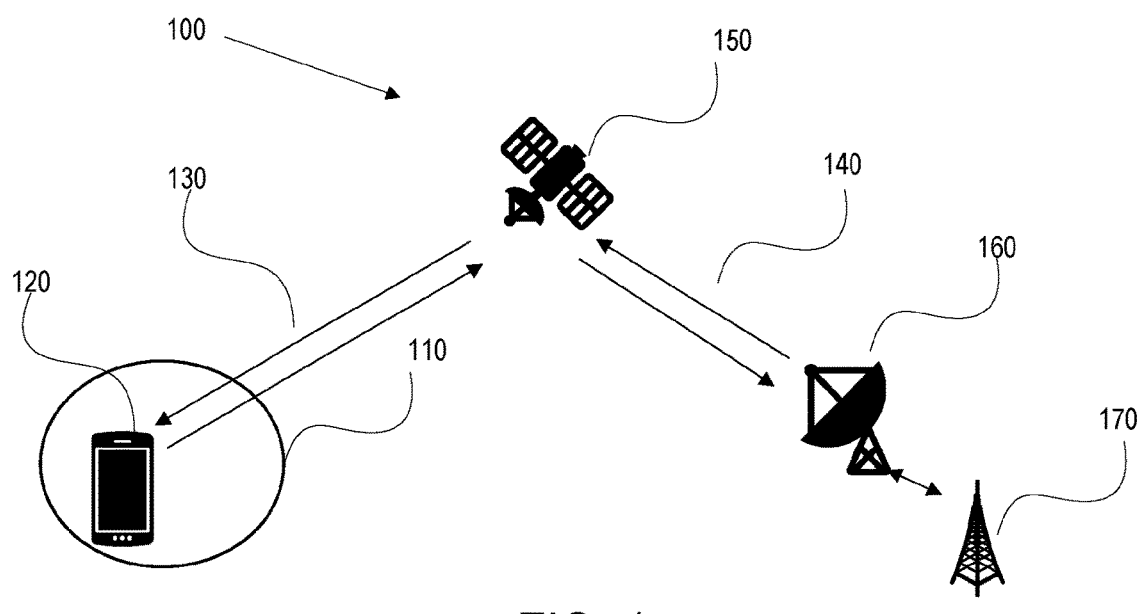
FIG. 1 is a schematic diagram illustrating an example of a satellite network with bent pipe transponders.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

To handle timing and frequency synchronization in a NR or LTE based NTN, a promising technique is to equip each device with a global navigation satellite system ("GNSS") receiver. The GNSS receiver allows a device to estimate its geographical position.

In one example, an NTN gNB carried by a satellite broadcasts its ephemeris data to a GNSS equipped UE. The UE can then determine one or more of the propagation delay, the delay variation rate, the Doppler shift and the Doppler shift variation rate based on its own location and possibly movement (obtained through GNSS measurements) and the satellite location and movement (derived from the ephemeris data). The GNSS receiver also allows a device to determine a time reference (e.g. in terms of coordinated universal time ("UTC")) and frequency reference. This can also be used to handle the timing and frequency synchronization in a NR or LTE based NTN.

In a second example, an NTN gNB carried by a satellite broadcasts its timing (e.g. in terms of a UTC timestamp) to a GNSS equipped UE. The UE can then determine one or more of the propagation delay, the delay variation rate, the Doppler shift and the Doppler shift variation rate based on its time/frequency reference (obtained through GNSS measurements) and the satellite timing and transmit frequency. The UE may use this knowledge to compensate its UL transmissions for the propagation delay and Doppler effect.

A GNSS measurement can in worst case take several minutes. GPS is, for example, using a bit rate of 50 bps for transmitting its navigation information. The transmission of the GPS date, time, and ephemeris information takes, for example, 30 s. Acquiring the GPS almanac containing orbital information for all satellites in the GPS constellation can take, for example, more than 10 min. If a UE already possesses this information the synchronization to the GPS signal for acquiring the UE position and UTC is a significantly faster procedure.

The pre-compensation method based on UE position above is not limited to GNSS positioning of the UE but can be used together with any UE positioning method supported by the UE and an available network (possibly the serving 3GPP NTN itself).

In the context of the embodiments described herein, the term 'access offset' is used to denote a time and/or frequency offset to be used by the UE when transmitting in the uplink to compensate for timing errors caused by the long distance between the UE and the receiving satellite and/or frequency errors (e.g. Doppler shift) caused by the high relative movement speed between the UE and the receiving satellite.

Further, the term 'access offset determination' will be used to refer to any UE method to determine the appropriate access offset.

A UE is required to support mobile terminated access by monitoring downlink ("DL") paging occasion ("PO") for a paging message addressed to the UE. The UE PO monitoring interval is determined by means of a configured DRX cycle.

In NR, LTE-M and NB-IoT based NTN it can be expected that the base station, at least in part, compensates for the Doppler shift induced on the access link to allow an NTN UE to receive the DL transmissions, including paging messages.

Reception of a paging message addressed to the UE triggers the UE to transmit a PRACH preamble towards the network. It is expected that the UE will pre-compensate for timing and frequency offsets based on information about the access offset. This can require that the UE has performed an access offset determination prior to the UL transmission.

A typical network implementation can expect that the UE triggers the preamble transmission shortly after receiving a page. In case the network does not detect an access attempt from a paged UE the network may retransmit the page transmission, possibly in a larger number of cells than the previous page transmission. This process is known as paging escalation.

In some examples, a UE monitors a PO without being paged. In these examples, it may not be meaningful to always perform access offset determination (e.g., GNSS measurements) prior to PO. Each access offset determination can increase the UE power consumption and, if the UE is not paged, this power may be considered wasted.

Various embodiments described herein allow a UE to perform an access offset determination (e.g., a GNSS measurement) after receiving a paging message addressed to the UE.

In some embodiments, the amount of access offset determinations an NTN UE performs in RRC_IDLE and RRC_INACTIVE mode when monitoring PO can be limited and/or reduced.

Figure 8:
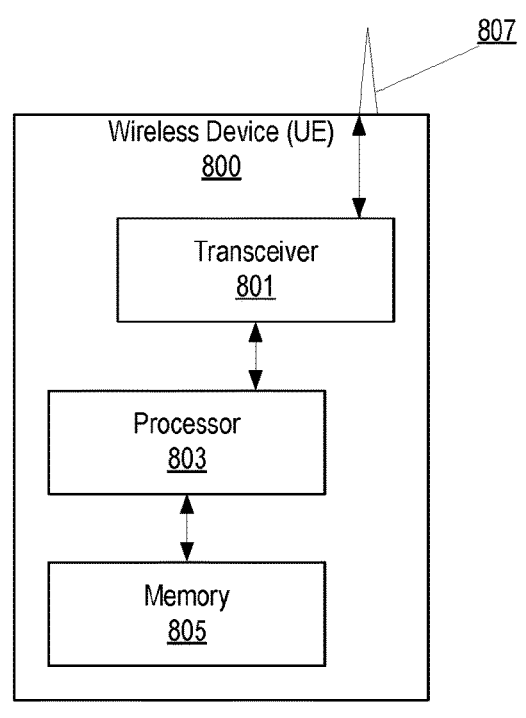
FIG. 8 is a block diagram illustrating an example of a wireless device ("UE") according to some embodiments of the present disclosure.

FIG. 8 is a block diagram illustrating elements of a wireless device UE 800 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device 800 may be provided, for example, as discussed below with respect to wireless device 4110 of FIG. 16.) As shown, wireless device UE may include an antenna 807 (e.g., corresponding to antenna 4111 of FIG. 16), and transceiver circuitry 601 (also referred to as a transceiver, e.g., corresponding to interface 4114 of FIG. 16) including a transmitter and a receiver configured to provide uplink and downlink radio communications with a base station(s) (e.g., corresponding to network node 4160 of FIG. 16) of a radio access network. Wireless device UE may also include processing circuitry 803 (also referred to as a processor, e.g., corresponding to processing circuitry 4120 of FIG. 16) coupled to the transceiver circuitry, and memory circuitry 805 (also referred to as memory, e.g., corresponding to device readable medium 4130 of FIG. 16) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that separate memory circuitry is not required. Wireless device UE may also include an interface (such as a user interface) coupled with processing circuitry 803, and/or wireless device UE may be incorporated in a vehicle.

As discussed herein, operations of wireless device UE may be performed by processing circuitry 803 and/or transceiver circuitry 801. For example, processing circuitry 803 may control transceiver circuitry 801 to transmit communications through transceiver circuitry 801 over a radio interface to a radio access network node (also referred to as a base station) and/or to receive communications through transceiver circuitry 801 from a RAN node over a radio interface. Moreover, modules may be stored in memory circuitry 805, and these modules may provide instructions so that when instructions of a module are executed by processing circuitry 803, processing circuitry 803 performs respective operations.

Figure 9:
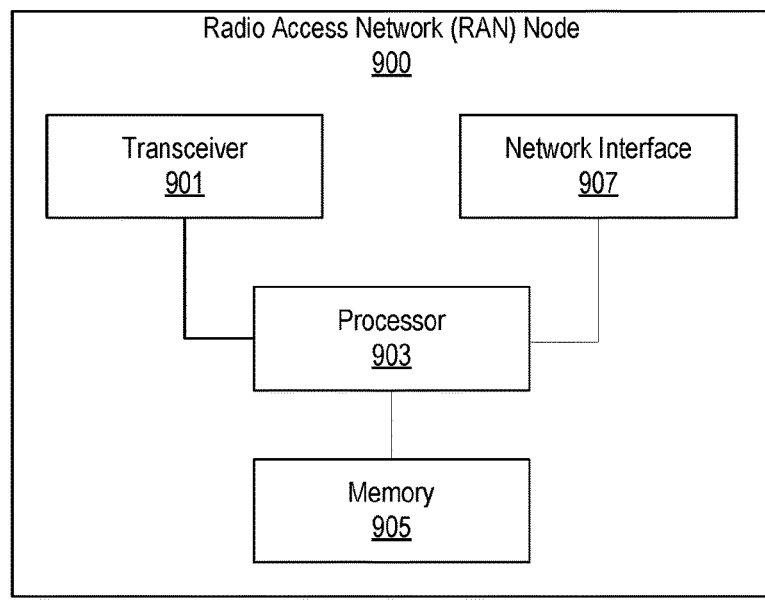
FIG. 9 is a block diagram illustrating an example of a radio access network ("RAN") node (e.g., a base station eNB/gNB) according to some embodiments of the present disclosure.

FIG. 9 is a block diagram illustrating elements of a radio access network RAN node 900 (also referred to as a network node, base station, eNodeB/eNB, gNodeB/gNB, etc.) of a Radio Access Network (RAN) configured to provide cellular communication according to embodiments of inventive concepts. (RAN node 900 may be provided, for example, as discussed below with respect to network node 4160 of FIG. 16.) As shown, the RAN node may include transceiver circuitry 901 (also referred to as a transceiver, e.g., corresponding to portions of interface 4190 of FIG. 16) including a transmitter and a receiver configured to provide uplink and downlink radio communications with mobile terminals. The RAN node may include network interface circuitry 907 (also referred to as a network interface, e.g., corresponding to portions of interface 4190 of FIG. 16) configured to provide communications with other nodes (e.g., with other base stations) of the RAN and/or core network CN. The network node may also include a processing circuitry 903 (also referred to as a processor, e.g., corresponding to processing circuitry 4170) coupled to the transceiver circuitry, and a memory circuitry 905 (also referred to as memory, e.g., corresponding to device readable medium 4180 of FIG. 16) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the RAN node may be performed by processing circuitry 903, network interface 907, and/or transceiver 901. For example, processing circuitry 903 may control transceiver 901 to transmit downlink communications through transceiver 901 over a radio interface to one or more mobile terminals UEs and/or to receive uplink communications through transceiver 901 from one or more mobile terminals UEs over a radio interface. Similarly, processing circuitry 903 may control network interface 907 to transmit communications through network interface 707 to one or more other network nodes and/or to receive communications through network interface from one or more other network nodes. Moreover, modules may be stored in memory 905, and these modules may provide instructions so that when instructions of a module are executed by processing circuitry 903, processing circuitry 903 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 10:
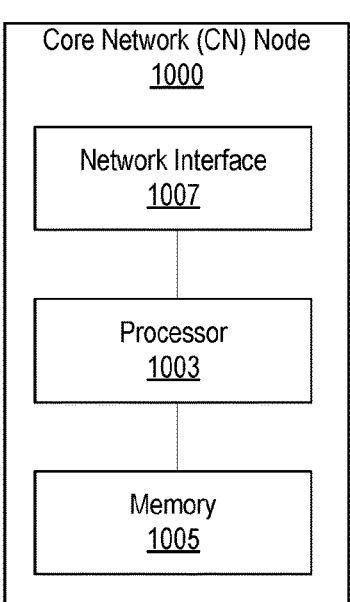
FIG. 10 is a block diagram illustrating an example of a core network ("CN") node (e.g., an AMF node, an SMF node, an OAM node, etc.) according to some embodiments of the present disclosure.

FIG. 10 is a block diagram illustrating elements of a core network CN node 1000 (e.g., an SMF node, an AMF node, a UDM node, a PCF node, a NEF node, a NRF node etc.) of a communication network configured to provide cellular communication according to embodiments of inventive concepts. As shown, the CN node 1000 may include network interface circuitry 1007 (also referred to as a network interface) configured to provide communications with other nodes of the core network and/or the radio access network RAN. The CN node 1000 may also include a processing circuitry 1003 (also referred to as a processor) coupled to the network interface circuitry, and memory circuitry 1005 (also referred to as memory) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the CN node 1000 may be performed by processing circuitry 1003 and/or network interface circuitry 1007. For example, processing circuitry 1003 may control network interface circuitry 1007 to transmit communications through network interface circuitry 1007 to one or more other network nodes and/or to receive communications through network interface circuitry from one or more other network nodes. Moreover, modules may be stored in memory 1005, and these modules may provide instructions so that when instructions of a module are executed by processing circuitry 1003, processing circuitry 1003 performs respective operations.

Figure 2:
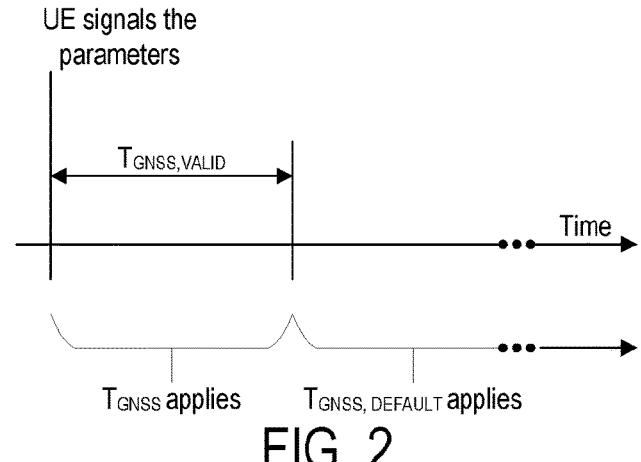
FIG. 2 is a diagram illustrating an example of $T_{GNSS}$, $T_{GNSS,VALID}$ and $T_{GNSS,DEFAULT}$ according to some embodiments of the present.

In some embodiments, a UE can signal information associated with GNSS measurements to a NTN network node. The information can include a time duration $T_{GNSS}$ that represents the time that the UE requires to complete a GNSS measurement; a time duration $T_{GNSS,VALID}$ for which the UE expects $T_{GNSS}$ to be valid; and a default time $T_{GNSS,DEFAULT}$ that applies after $T_{GNSS,VALID}$ has expired. The use of $T_{GNSS}$, $T_{GNSS,VALID}$ and $T_{GNSS,DEFAULT}$ is illustrated in FIG. 2.

In some embodiments, operations are provided to make power efficient use of GNSS and only measure GNSS when needed.

In some examples, a UE may, for example, require a short $T_{GNSS}$ as long as the UE possesses up to date GPS navigation information. The expiration of $T_{GNSS,VALID}$ may, for example, correspond to the time when the GPS navigation information is outdated. In additional or alternative examples, the $T_{GNSS,DEFAULT}$ may correspond to the time a UE requires for GNSS measurement when it needs to acquire the GNSS navigation information as part of the measurement.

In some embodiments, the UE may omit the $T_{GNSS,DEFAULT}$ parameter and/or the $T_{GNSS,VALID}$ parameter in the information signaled to the NTN network node if the UE implements a strategy where it always maintains up to date GNSS navigation information.

Figure 3:
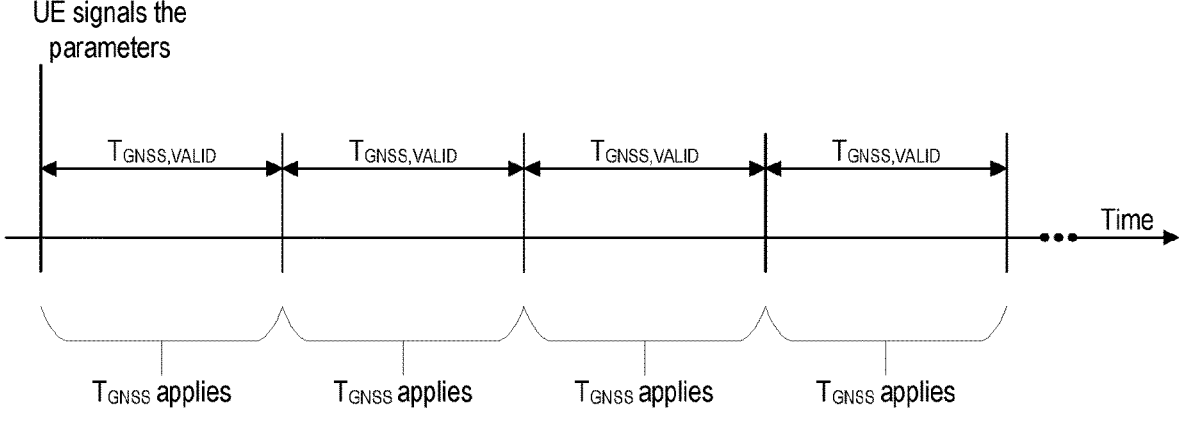
FIG. 3 is a diagram illustrating an example in which a UE ensures it always possess up-to-date GNSS navigation information according to some embodiments of the present disclosure.

In some embodiments, as illustrated in FIG. 3, $T_{GNSS,VALID}$ is configured by the UE to infinity, to indicate that the UE makes sure to always possess up to date GNSS navigation information.

Figure 4:
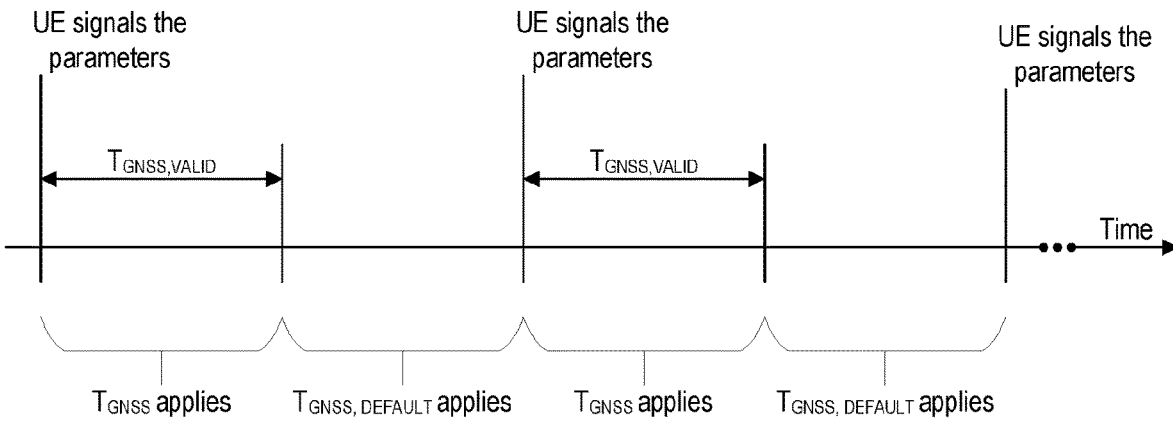
FIG. 4 is a diagram illustrating an example in which the UE notifies the network node when it updates its GNSS navigation information according to some embodiments of the present disclosure.
Figure 5:
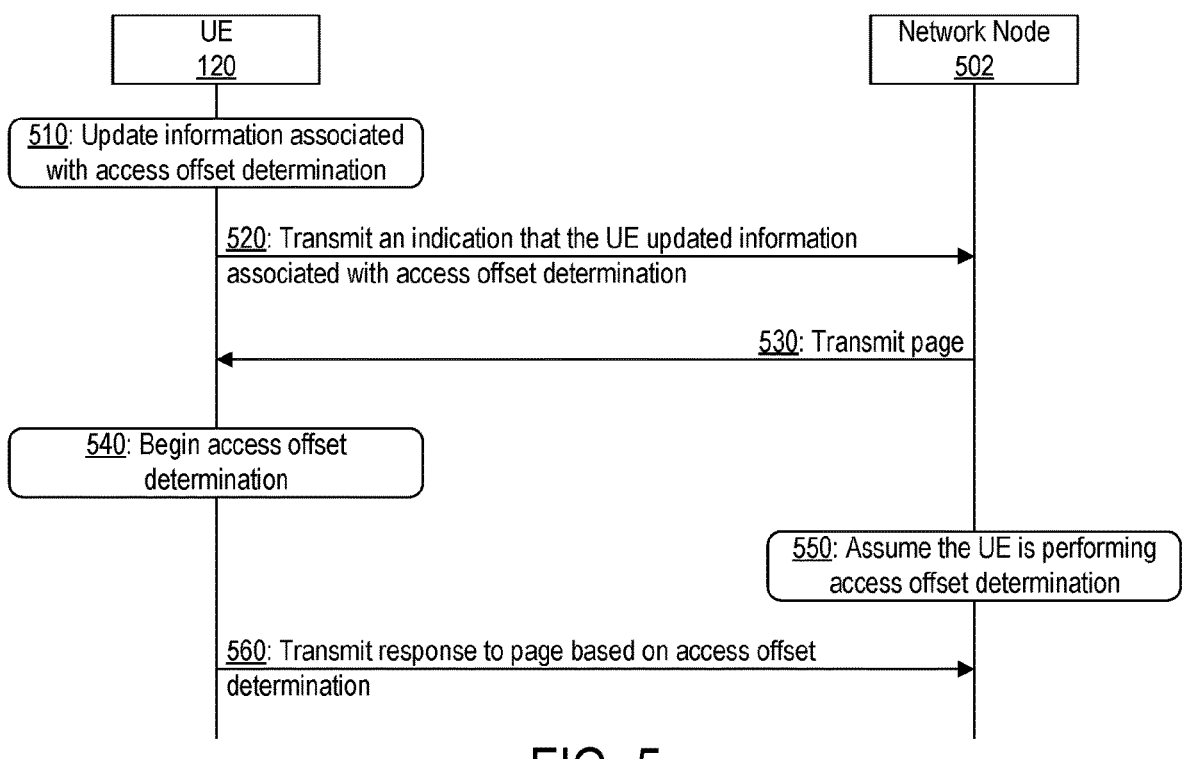
FIG. 5 is a signal flow diagram illustrating the example of FIG. 4 in which the UE notifies the network node when it updates its GNSS navigation information according to some embodiments of the present disclosure.

In some embodiments, as illustrated in FIGS. 4-5, the UE transmits information associated with GNSS measurements to the NTN network node every time it has re-acquired the GNSS navigation information. In FIG. 5, at operation 510, the UE 120 updates information (e.g., GNSS navigation information) associated with access offset determination (e.g., GNSS measurements). At operation 520, the UE 120 transmits an indication that the UE updated the information associated with the access offset determination to the network node 502. At operation 530, the network node 502 transmits a page to the UE 120. At operation 540, UE 120 begins an access offset determination. At operation 550, the network node 502 assumes that the UE 120 is performing the access offset determination based on knowing that the UE 120 updated the information associated with the access offset determination and knowing how long it takes for the UE 120 to perform the access offset determination with updated information (or without if the updated information is no longer valid). At operation 560, UE 120 transmits a response to the page based on the access offset determination.

In additional or alternative embodiments, the UE may signal any or all of the above described information to the network when the UE is in a RRC_CONNECTED state. The information may be stored in the core network (e.g., in an access and mobility management function ("AMF")) when the UE is released to a RRC_IDLE state and/or in a radio access network ("RAN") (e.g., in a gNB) when the UE is released to a RRC_INACTIVE state. The network may then use the information in conjunction with paging.

In some embodiments, the information is signaled to the network via a non-access stratum ("NAS") layer during, but not limited to, an "attach" procedure.

Figure 6:
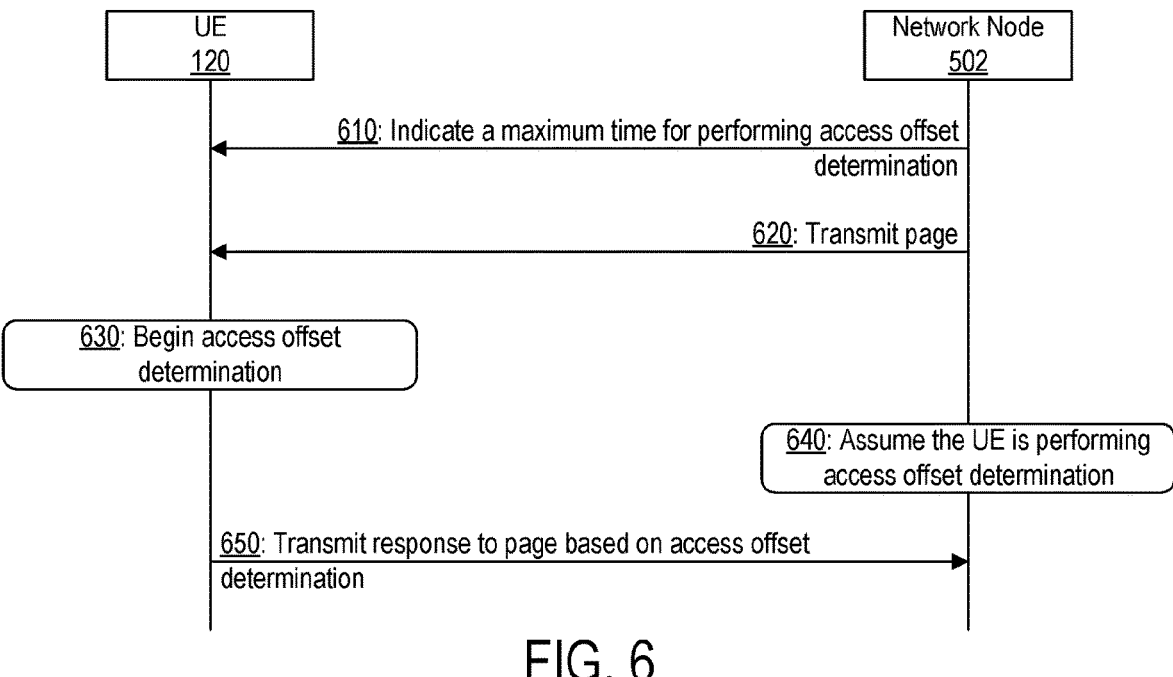
FIG. 6 is a signal flow diagram illustrating an example in which the network notifies the communication device of a maximum time for performing an access offset determination according to some embodiments of the present disclosure.

In some embodiments, the maximum time $T_{GNSS,MAX}$, which represents a time that the UE is allowed to use for completing a GNSS measurement, is determined in a technical specification or broadcast as part of the system information block signaled in the cell. FIG. 6 illustrates an example in which the network transmits the maximum time that the UE is allowed to perform the access offset determination. At operation 610, network node 502 transmits the maximum time for performing the access offset determination to the UE 120. At operation 620, the network node 502 transmits a page to the UE 120. At operation 630, the UE 120 begins the access offset determination. At operation 640, the network node 502 assumes that the UE 120 is performing the access offset determination based on knowing that the maximum time allowed for the UE 120 to perform the access offset determination. At operation 650, UE 120 transmits a response to the page based on the access offset determination.

The broadcasted parameter may be from a value range determined in a technical specification indicating the maximum time a UE is allowed to use for completing a GNSS measurement. The parameter $T_{GNSS,MAX}$ may then be used by the network instead of the parameter $T_{GNSS}$. In these examples, $T_{GNSS}$ may not be signaled by the UE. In some embodiments, the determination time may be refined into one parameter representing the maximum time allowed for a full GNSS measurement including retrieval of GNSS navigation information, for example, $T_{FULL\_GNSS,MAX}$, and one parameter representing the maximum time allowed for completing a "partial GNSS measurement", i.e. when the GNSS navigation information was a priori acquired, for example, $T_{PARTIAL\_GNSS,MAX}$. The parameters $T_{PARTIAL\_GNSS,MAX}$ and $T_{FULL\_GNSS,MAX}$ may then be used by the network instead of the parameters $T_{GNSS}$ and $T_{GNSS,DEFAULT}$, respectively. In this example, $T_{GNSS}$ and $T_{GNSS,DEFAULT}$ do not need to be signaled by the UE.

In some embodiments, the $T_{GNSS}$, $T_{GNSS,VALID}$, $T_{GNSS,DEFAULT}$, $T_{GNSS,MAX}$, $T_{PARTIAL\_GNSS,MAX}$, and $T_{FULL\_GNSS,MAX}$ may be mobility state dependent. Different values can be used for different states which may include normal-mobility state, medium-mobility state, and high-mobility state. In a non-limiting example, a baseline value is configured for a time duration, T, and different scaling factor values are configured for different mobility states. In these examples, a scaling factor can be used to multiply the baseline value of T to derive a corresponding applicable value for the target mobility state configured with the scaling factor.

In some embodiments, the UE periodically updates its GNSS navigation information such that the time $T_{GNSS,VALID}$ is also the time after which it initiates an update of the navigation information which requires a time up to $T_{GNSS,DEFAULT}$ to complete. After a lapse of $T_{GNSS,DEFAULT}$ following the expiry of $T_{GNSS,VALID}$, the network restarts the timer $T_{GNSS,VALID}$.

In additional or alternative embodiments, the UE periodically updates its GNSS navigation information and indicates to the network a GNSS navigation information update period following which it will update GNSS navigation information. The network can use this information to facilitate paging procedures.

In some examples, based on the periodicity information signaled by the UE, the network can determine whether or not a paging message will overlap with the GNSS navigation update occasion. If a first page is sent that does not overlap with the GNSS navigation information acquisition, and the network does not receive a UE response for the first page, the network may still schedule a second page after $T_{GNSS}$ without accounting for $T_{GNSS,DEFAULT}$.

Although the innovations herein have been described in regards to GNSS measurements, the innovations are applicable to any access offset determination process. In some embodiments, the UE signals the time $T_{(method\ x)}$ for any access offset determination method (or methods) it supports. $T_{(method\ x)}$ is the time the UE requires to complete an access offset determination using the given method. Depending on the characteristics of the method, the equivalents of $T_{GNSS,VALID}$, $T_{GNSS,DEFAULT}$, and $T_{GNSS,MAX}$ (or $T_{FULL\_GNSS,MAX}$ and $T_{PARTIAL\_GNSS,MAX}$) can also be defined in a straightforward manner.

In additional or alternative embodiments, the UE may signal to the network its preferred access offset determination method. For example, if in a given system or deployment, a UE is able to make better estimates using a specific access offset determination method, the UE may indicate this to the network such that the UE can be configured for that access offset determination method.

In additional or alternative embodiments, the maximum time $T_{accessoffsetdetermination,MAX}$ that a UE is allowed to use for completing an access offset determination is determined in a technical specification or broadcast as part of the SIB signaling in the cell. The broadcasted parameter may be from a value range determined in a technical specification indicating the maximum time a UE is allowed to use for completing an access offset determination.

In additional or alternative embodiments, at least one default offset determination method is mandatorily supported by the UE. The UE may additionally report to the network other access offset determination methods that it supports.

In additional or alternative embodiments, one or more offset determination methods is broadcast as part of the SIB signaling in the cell. If a UE does not support any of the broadcasted offset determination methods it may be prevented from accessing the cell.

In some embodiments, the network uses the expected time $T_{EXPECTED}$ that a UE requires to perform an access offset determination (and thus TA and Doppler shift compensation assessment) to determine the time period between a first page sent to a UE and a second retransmitted and/or escalated page, sent in case the UE does not respond to the first page with an uplink transmission. The time period between first and second page can be determined by extending the nominal response time (the response time the network would expect without access offset determination prior to response, including, for example, one round-trip time and wait time for the next physical random access channel ("PRACH") resource by $T_{EXPECTED}$. In additional or alternative embodiments, a UE is allowed to perform its access offset determination first, after receiving a paging message addressed to the UE, and before the UE responds to the network (e.g., before it initiates the random access procedure). In additional or alternative embodiments, the expected time $T_{EXPECTED}$ may be determined based on the signaling described above.

In some embodiments, The network may broadcast an indication whether it supports access offset determination after the UE receives a page addressed to the UE. In some examples, this indication may indicate that the UE may delay responding to a paging message until access offset determination is performed/completed. In additional or alternative examples, the indication may indicate that the UE is required to perform access offset determination before each PO. In additional or alternative examples, the indication may indicate that the UE is not allowed to perform access offset determination between page reception and page response. It may then be up to the UE to ensure that its access offset assessment is accurate enough prior to each PO. In additional or alternative embodiments, the broadcast indication may also be omitted and the requirement on the UE may instead be specified in a standard.

Figure 7:
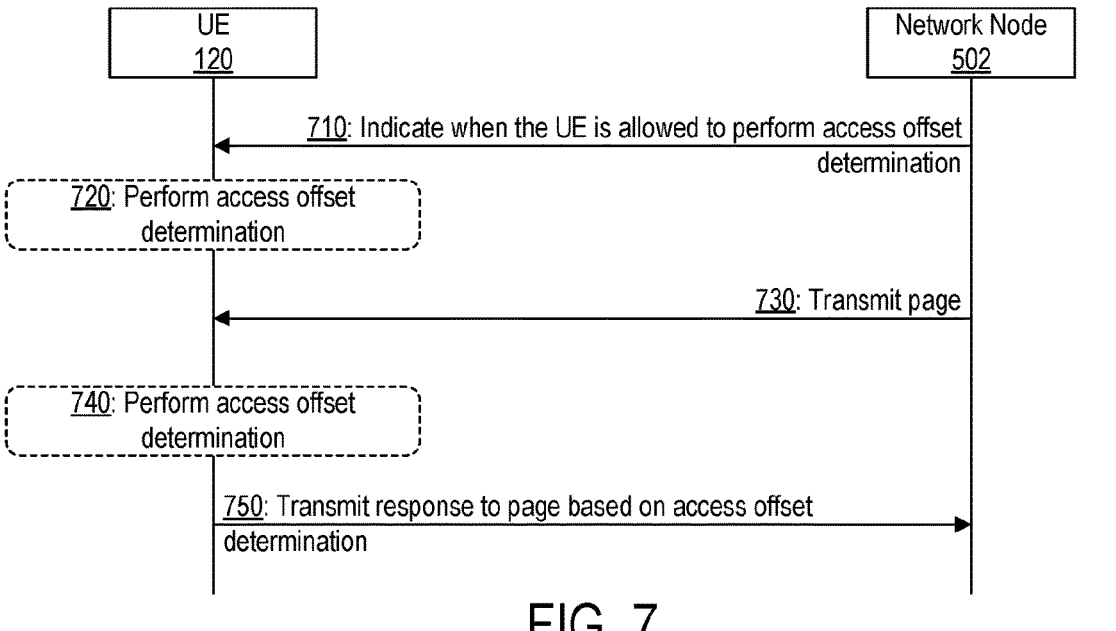
FIG. 7 is a signal flow diagram illustrating an example in which the network notifies the communication device when the UE is allowed to perform access offset determination according to some embodiments of the present disclosure.

In FIG. 7, the network node 502 indicates when the UE is allowed to perform access offset determination. At operation 710, network node 502 indicates when the UE is allowed to perform access offset determination. In some examples, this may be an explicit indication. In other examples, the indication may be implicit by providing a maximum amount of time allowed for performing the access offset determination. At either operation 720 or 740 the UE 120 performs the access offset determination (before or after the network node 502 transmits the page). At operation 750, the UE 120 transmits a response to the page based on the access offset determination.

In some embodiments, the network may communicate (e.g. in system information or during an "attach" procedure) a maximum delay that is acceptable due to performing access offset determination. The UE can choose to apply such delay if it supports multiple access offset determination mechanisms, one of which satisfies at least the maximum delay indicated by the network. If the UE does not support any access offset determination method that satisfies the maximum delay indicated by the network, it can react by performing access offset determination before each PO.

In additional or alternative embodiments, in addition to the possibility of providing a maximum delay, the network may confirm/acknowledge that the UE can delay responding to a paging message until access offset determination is performed based on whether the UE is configured with an eDRX cycle or the (e)DRX cycle value is more than a certain threshold. In additional or alternative embodiments, this confirmation/acknowledgment may be conditional to whether such delay is supported in the serving cell or tracking area. Indication for support in the serving cell may be broadcast as part of system information broadcast message. Indication for support in a particular tracking area may be provided during tracking area update ("TAU").

In some embodiments, the network does not require the UE to perform access offset determination before each PO, but it requires from the UE to be aware of its own access offset at each PO. Then it is up to the UE to decide if and when it needs to perform access offset determination. The UE may determine that this will require it to perform access offset determination prior to each PO, but the UE may also employ other strategies depending on the circumstances (such as UE capabilities, UE speed, frequency of POs), for example, performing access offset determination prior to every Nth PO (e.g. if the POs are frequent) or relying on continuous movement/position tracking (e.g. using acceleration sensors) complemented by infrequent full UE positioning measurements. For example, stationary UEs aware of their (fixed) position and relying on UE position-based access offset determination would not need to perform UE positioning at all.

In some embodiments, the network broadcasts an indication that the UEs are required to ensure that they always possess up to date GNSS navigation information (or equivalent information for another access offset determination method), for example, that $T_{GNSS,VALID}$ (or equivalent parameter for other access offset determination methods) should be configured by the UE to infinity. In additional or alternative embodiments, the above-mentioned indication is used as access barring such that UEs not able to ensure up to date GNSS navigation information (or equivalent for another access offset determination method) are not allowed to select the cell for camping. In some examples, a UE may select the cell as acceptable cell but not as a suitable cell.

In additional or alternative embodiments, the aforementioned indications can be transmitted to a UE by dedicated signaling instead of being broadcasted. This would allow the network to treat different UEs differently, depending on their capabilities and service expectations. For example, for certain UEs a long response time might not matter, but energy efficiency might be important, so they may perform access offset determination only when needed. Other UEs might prefer a quick response over power savings (e.g. because they are not relying on battery power), and thus can afford to perform access offset determination frequently.

In additional or alternative embodiment, the aforementioned indications are given to the UE in the a redirect message, e.g. an RRCRelease message containing a RedirectCarrierInfo IE, such that the UE is able to reselect to a cell/carrier that matches the UE's capability or preference for making access offset determination. In a generalization, the information may be included in general NTN related measurement information. For example, UE may be informed in the measurement information about access offset of the cell or TA accuracy requirement.

In some embodiments, the information is transmitted in the RRCRelease message when the UE is released to a RRC_IDLE or RRC_INACTIVE state. In additional or alternative embodiments, the network includes the information in the page, either in the RRC Paging message on the PDSCH or in the paging DCI on the PDCCH.

In some embodiments, whether a UE needs to do access offset determination before or after the paging reception can be determined at least in part by one or more of the following: the PRACH configuration; the random access type that the UE selects; whether a SS RSRP or CSI-RSRP is above a RSRP threshold; and whether a SS-RSRP or CSI-RSRP variation is above a threshold.

In some examples, whether a UE needs to do access offset determination before or after the paging reception can be determined based on the PRACH configuration. For example, when a long PRACH format, NTN-specific PRACH type, or a longer PRACH configuration period relative to the time duration of the paging cycle is used, the UE can do the access offset determination either before or after the paging reception.

In some examples, whether a UE needs to do access offset determination before or after the paging reception can be determined based on the random access that the UE selects. For example, when a 2-step RACH type is selected, which means a higher RSRP threshold is measured by the UE, the UE can do the access offset determination either before or after the paging reception.

In some examples, whether a UE needs to do access offset determination before or after the paging reception can be determined based on whether a SS-RSRP or CSI-RSRP is above a RSRP threshold wherein the threshold is RRC configured (separately configured or the existing RSRP threshold configured, e.g. rsrp-ThresholdSSB or msgA-RSRP-ThresholdSSB) or predetermined in the specification or a fixed value. For example, when the signal level is above a threshold, the link quality might be good enough for PRACH transmission as well, in which case the UE may not be required to perform access offset determination after each paging reception.

In some examples, whether a UE needs to do access offset determination before or after the paging reception can be determined based on whether a SS-RSRP or CSI-RSRP variation is above a threshold wherein the threshold is RRC configured or predetermined and the variation can be defined e.g. as a function of average RSRP and a maximum RSRP calculated in a certain time duration, for example within one SSB to RO mapping period.

In some embodiments, when an NTN-specific PRACH configuration (e.g. double ZC sequence PRACH design) is configured, the UEs without accurate access offset information can also use NTN-specific PRACH for random access as a response to paging, besides using normal PRACH transmission used in terrestrial network. This means a UE can do access offset determination either before or after the paging reception when it selects a normal PRACH, or the UE does not do any access offset determination and only relies on the NTN-specific PRACH transmission. When only normal RA (single ZC sequence PRACH, legacy) is configured, UEs to access this cell are always required to have up to date access offset information for compensation of timing/frequency error before random access, which means they need to do access offset determination before paging response transmission.

In additional or alternative embodiments, explicit indication of access offset determination information (e.g. the support of delaying access offset determination until after paging reception) can be provided in system information. The explicit indication may only apply to the cases when one or more of the rules provided in the above embodiment are met, for example, the explicit signaling is ignored by UE when a long PRACH format is configured or when a NTN-specific PRACH design is supported.

In some embodiments, even if the network can allow an increased delay between the page and until absence of response triggers a page repetition and/or page escalation, it does not have to. If the network has plenty of paging resources, it may opt to go for quick repetition/escalation, just in case the UE is not just slow to respond, but actually missed the page (i.e. proactive network behavior is of course not precluded). The network could also base the choice of this behavior on knowledge about the UE, for example, subscription data or capability information.

In additional or alternative embodiments, even if the network has signaled that it supports a long time between page and page response (e.g. long enough for a UE to perform access offset determination), the UE is not obliged to utilize this possibility (e.g. by performing access offset determination between page reception and page response). The UE can respond to a page as soon as it has a good enough access offset estimate. This may require access offset determination after receiving the page, but the UE may also have made sure that it has a good enough access offset estimate prepared in advance. This is up to the UE implementation and may well be configurable by the user and/or applications to adapt to user preferences (e.g. a patient or non-patient user and maybe depending on the battery capacity and availability of charging possibilities) or application requirements (e.g. low or high setup delay tolerance).

In some embodiments, the network sends an indication prior to a PO to indicate that the PO contains a paging transmission. This indication triggers one or more UEs configured to monitor the PO to perform an access offset determination. The time between the indication and the PO may be determined by $T_{EXPECTED}$. The indication may be designed to address one or more UEs. The indication may be sent by means of a wake-up signal (WUS).

In some embodiments, the TA accuracy requirement can be discussed with respect to initial access as well as cell and PLMN selection (UE camping). In some examples, based on random access TA accuracy requirements, different random access resources may be configured, or UEs may be classified based on their ability for a certain accuracy level for estimation of the timing advance value.

In additional or alternative embodiments, the network may configure UEs with a TA accuracy required for the RA preamble transmission. The network would then adapt to this by adapting the RA preamble reception window at the gNB.

In additional or alternative embodiments, based on this configuration by the network, UEs will employ different strategies and, for example, determine their TA accuracy "status" prior to each PO. The UE's TA accuracy status refers to the accuracy (e.g. accuracy interval or error interval) the UE estimates that its currently stored TA has. This may depend on the time that has elapsed since the last TA update or the last TA or access offset determination, the age of acquired measurements, for example, GNSS measurements, the age of GNSS navigation data, or the order of magnitude of the distance the UE estimates that it has moved (e.g. based on internal accelerator sensors) since its last positioning measurement (e.g. the last GNSS measurement). A UE may choose between different access offset determination methods, in order to achieve the required access offset accuracy in the most efficient way (e.g. with the least energy consumption). As one option, the UE may choose to proactively maintain a valid access offset estimate, for example, based on ephemeris data and knowledge of its own stationarity, or based on ephemeris data, infrequent GNSS measurements and intermediate tracking of the UE position by dead reckoning based on acceleration sensors, or based on frequent GNSS measurements (e.g. a UE for which energy consumption is not an issue).

Operations of a communication device will now be discussed with reference to FIGS. 11-13 according to some embodiments of inventive concepts. For example, modules (also referred to as units) may be stored in memory 805 of FIG. 8, and these modules may provide instructions so that when the instructions of a module are executed by processing circuitry 803, processing circuitry 803 performs respective operations of the flow charts of FIGS. 11-13.

In FIG. 11 a communication device performs operations according to some embodiments. The communication device can be configured to operate in a non-terrestrial network that includes a network node communicatively coupled to the communication device via a satellite.

At block 1110, processing circuitry 803 determines when to perform an access offset determination ("AOD") relative to a paging occasion. In some embodiments, determining when to perform the AOD comprises determining when to perform the AOD relative to the PO based on the information.

At block 1120, processing circuitry 803 communicates, via transceiver 801, information associated with the AOD to the network node. In some embodiments, communicating the information includes receiving an indication from the network node indicating one or more types of AOD processes that are allowed by the communication network.

In additional or alternative embodiments, communicating the information includes transmitting the information to the network node. In additional or alternative embodiments, the information includes at least one of: an indication of a first amount of time, $T_{AOD}$, that the communication device requires to complete an AOD; an indication of an amount of time, $T_{AOD,VALID}$, that the communication device expects $T_{AOD}$ to be valid; and an indication of a second amount of time, $T_{AOD,DEFAULT}$, that the communication device requires to complete the AOD.

In additional or alternative embodiments, transmitting the information comprises transmitting the information to the network node via a non-access stratum layer during an attach procedure. In additional or alternative embodiments, the information is determined based on a mobility state of the communication device.

FIG. 12 illustrates an example in which the communication device transmits notifies the network node when it updates navigation information associated with the AOD.

At block 1210, processing circuitry 803 updates the navigation information associated with the AOD. At block 1220, processing circuitry 803 transmits, via transceiver 801, an indication that the communication device has updated the navigation information to the network node.

In some embodiments, the communication device periodically updates the navigation information associated with the AOD after each $T_{AOD,VALID}$. In additional or alternative embodiments, the information can include an indication that the communication device periodically updates the navigation information associated with the AOD after each $T_{AOD,VALID}$ and, in some examples, this prevents the communication device from needing to notify the network node when it updates the navigation information.

In additional or alternative embodiments, communicating the information includes receiving at least one of an indication of an amount of time, $T_{AOD,MAX}$, that the communication device is allowed to use for completing an access offset determination; an indication of an amount of time, $T_{FULL\_AOD,MAX}$, that the communication device is allowed to perform full access offset determination; and an indication of an amount of time, $T_{PARTIAL\_AOD,MAX}$, that the communication device is allowed to perform partial access offset determination.

FIG. 13 illustrates an example in which the communication device performs the AOD after receiving the PO. At block 1310, processing circuitry 803 receives, via transceiver 801, a page from the network node. At block 1320, processing circuitry 803 performs the AOD. At block 1330, processing circuitry 803 transmits, via transceiver 801, a response to the page based on the AOD.

Various operations of FIGS. 11-13 may be optional with respect to some embodiments. For example, in regards to Embodiment 1 (described below), block 1120 of FIG. 11; blocks 1210 and 1220 of FIG. 12; and blocks 1310, 1320, and 1330 of FIG. 13 may be optional.

In some embodiments, the AOD is a process to determine at least one of: a propagation delay; and a Doppler shift associated with the communication channel between the communication device and the network node. In additional or alternative embodiments, the AOD is a global navigation satellite system, GNSS, AOD process.

Operations of a network node will now be discussed with reference to FIGS. 14-15 according to some embodiments of inventive concepts. For example, modules (also referred to as units) may be stored in memory 905 of FIG. 9, and these modules may provide instructions so that when the instructions of a module are executed by processing circuitry 903, processing circuitry 903 performs respective operations of the flow charts of FIGS. 14-15. Although the operations of FIGS. 14-15 are described as being performed by a RAN network node, the operations can be performed by any suitable network node.

FIG. 14 a network node performs operations according to some embodiments. The network node is configured to operate in a non-terrestrial network that includes a communication device communicatively coupled to the network node via a satellite.

At block 1410, processing circuitry 903 communicates, via transceiver 901, information with the communication device. The information can be associated with an AOD to be performed by the communication device.

In some embodiments, communicating the information includes transmitting an indication to the communication device indicating one or more types of AOD processes that are allowed by the communication network. In additional or alternative embodiments, communicating the information further includes receiving an indication from the communication device indicating a type of AOD process that the communication device prefers to perform.

In some embodiments, communicating the information includes receiving the information from the communication device. The information can include at least one of: an indication of a first amount of time, $T_{AOD}$, that the communication device requires to complete an AOD; an indication of an amount of time, $T_{AOD,VALID}$, that the communication device expects $T_{AOD}$ to be valid; and an indication of a second amount of time, $T_{AOD,DEFAULT}$, that the communication device requires to complete the AOD. In additional or alternative embodiments, receiving the information includes receiving the information from the communication device via a non-access stratum layer during an attach procedure.

In additional or alternative embodiments, communicating the information includes transmitting at least one of an indication of an amount of time, $T_{AOD,MAX}$, that the communication device is allowed to use for completing an access offset determination; an indication of an amount of time, $T_{FULL\_AOD,MAX}$, that the communication device is allowed to perform full access offset determination; and an indication of an amount of time, $T_{PARTIAL\_AOD,MAX}$, that the communication device is allowed to perform partial access offset determination. In additional or alternative embodiments, the information can be determined based on a mobility state of the communication device.

At block 1420, processing circuitry 903 transmits, via transceiver 901, a page to the communication device.

At block 1430, processing circuitry 903 determines that a period of time associated with the information has elapsed since transmitting the page. In some embodiments, the information includes an indication that the communication device periodically updates the navigation information associated with the AOD after each $T_{AOD,VALID}$. In these embodiments, the period of time can be set to $T_{AOD}$.

At block 1440, processing circuitry 903 retransmits, via transceiver 901, the page to the communication device. In some embodiments, the page is retransmitted in response to the period of time elapsing.

FIG. 15 illustrates an example in which the UE notifies the network node when it updates the navigation information associated with the AOD.

At block 1510, processing circuitry 903 receives, via transceiver 901, an indication that the communication device has updated the navigation information associated with the AOD. At block 1520, processing circuitry 903 starts a timer based on $T_{AOD,VALID}$. At block 1530, processing circuitry 903 determines that the period of time is $T_{AOD}$ or $T_{AOD,DEFAULT}$ based on whether the timer has expired. At block 1540, processing circuitry 903 retransmits, via transceiver 901, the page to the communication device.

Various operations of FIGS. 14-15 may be optional with respect to some embodiments. For example, in regards to Embodiment 14 (described below), block 1410 of FIG. 14 and blocks 1510, 1520, 1530 and 1540 of FIG. 15 may be optional.

In some embodiments, the AOD is a process to determine at least one of: a propagation delay; and a Doppler shift associated with the communication channel between the communication device and the network node. In additional or alternative embodiments, the AOD is a global navigation satellite system, GNSS, AOD process.

Example Embodiments are discussed below. Reference numbers/letters are provided in parenthesis by way of example/illustration without limiting example embodiments to particular elements indicated by reference numbers/letters.

Embodiment 1. A method of operating a communication device configured to operate in a non-terrestrial network that includes a network node communicatively coupled to the communication device via a satellite, the method comprising:

determining (1110) when to perform an access offset determination, AOD, relative to a paging occasion, PO; and communicating (1120) information associated with the AOD to the network node.

Embodiment 2. The method of Embodiment 1, wherein communicating the information comprises transmitting the information to the network node, and wherein the information comprises at least one of: an indication of a first amount of time, $T_{AOD}$, that the communication device requires to complete an AOD; an indication of an amount of time, $T_{AOD,VALID}$, that the communication device expects $T_{AOD}$ to be valid; and an indication of a second amount of time, $T_{AOD,DEFAULT}$, that the communication device requires to complete the AOD.

Embodiment 3. The method of Embodiment 2, wherein transmitting the information comprises transmitting the information to the network node via a non-access stratum layer during an attach procedure.

Embodiment 4. The method of any of Embodiments 1-3, wherein transmitting the information to the network node comprises determining the information based on a mobility state of the communication device.

Embodiment 5. The method of any of Embodiments 1-4, further comprising:

periodically updating (1210) navigation information associated with the AOD after each $T_{AOD,VALID}$, wherein the information further comprises an indication that the communication device periodically updates the navigation information associated with the AOD after each $T_{AOD,VALID}$.

Embodiment 6. The method of any of Embodiments 1-4, further comprising:

updating (1210) navigation information associated with the AOD; and responsive to updating the navigation information, transmitting (1220) an indication that the communication device has updated the navigation information to the network node.

Embodiment 7. The method of any of Embodiments 1-6, wherein communicating the information comprises receiving at least one of an indication of an amount of time, $T_{AOD,MAX}$, that the communication device is allowed to use for completing an access offset determination; an indication of an amount of time, $T_{FULL\_AOD,MAX}$, that the communication device is allowed to perform full access offset determination; and an indication of an amount of time, $T_{PARTIAL\_AOD,MAX}$, that the communication device is allowed to perform partial access offset determination.

Embodiment 8. The method of Embodiment 7, wherein determining when to perform the AOD comprises determining when to perform the AOD relative to the PO based on the information.

Embodiment 9. The method of any of Embodiments 1-8, wherein determining when to perform the AOD relative to the PO comprises determining to perform the AOD after the PO, the method further comprising:

receiving (1310) a page from the network node;

responsive to receiving the page, performing (1320) the AOD; and responsive to performing the AOD, transmitting (1330) a response to the page based on the AOD.

Embodiment 10. The method of any of Embodiments 1-9, wherein the AOD is a process to determine at least one of: a propagation delay; and a Doppler shift associated with the communication channel between the communication device and the network node.

Embodiment 11. The method of any of Embodiments 1-10, wherein the AOD is a global navigation satellite system, GNSS, AOD process.

Embodiment 12. The method of any of Embodiments 1-11, wherein communicating the information comprises receiving an indication from the network node indicating of one or more types of AOD processes that are allowed by the communication network.

Embodiment 13. The method of any of Embodiments 1-12, wherein communicating the information comprises transmitting an indication to the network node indicating a type of AOD process that the communication device prefers to perform.

Embodiment 14. A method of operating a network node configured to operate in a non-terrestrial network that includes a communication device communicatively coupled to the network node via a satellite, the method comprising:

communicating (1410) information with the communication device, the information associated with an access offset determination, AOD, to be performed by the communication device;

transmitting (1420) a page to the communication device;

responsive to transmitting the page, determining (1430) that a period of time associated with the information has elapsed since transmitting the page; and responsive to determining that the period of time has elapsed, retransmitting (1440) the page to the communication device.

Embodiment 15. The method of Embodiment 14, wherein communicating the information comprises receiving the information from the communication device, and wherein the information comprises at least one of: an indication of a first amount of time, TAOD, that the communication device requires to complete an AOD; an indication of an amount of time, TAOD,VALID, that the communication device expects TAOD to be valid; and an indication of a second amount of time, TAOD, DEFAULT, that the communication device requires to complete the AOD.

Embodiment 16. The method of Embodiment 15, wherein receiving the information comprises receiving the information from the communication device via a non-access stratum layer during an attach procedure.

Embodiment 17. The method of any of Embodiments 15-16, wherein the information further comprises an indication that the communication device periodically updates the navigation information associated with the AOD after each TAOD,VALID, and wherein the period of time is TAOD.

Embodiment 18. The method of any of Embodiments 15-16, further comprising:

receiving (1510) an indication that the communication device has updated the navigation information associated with the AOD;

responsive to receiving the indication that the communication device has updated the navigation information associated with the AOD, starting (1520) a timer based on TAOD,VALID; and determining (1530) the period of time is TAOD or TAOD, DEFAULT based on whether the timer has expired.

Embodiment 19. The method of any of Embodiments 14-18, wherein communicating the information comprises transmitting at least one of an indication of an amount of time, TAOD,MAX, that the communication device is allowed to use for completing an access offset determination; an indication of an amount of time, TFULL_AOD,MAX, that the communication device is allowed to perform full access offset determination; and an indication of an amount of time, TPARTIAL_AOD, MAX, that the communication device is allowed to perform partial access offset determination.

Embodiment 20. The method of Embodiment 19, wherein communicating the information further comprises determining the information based on a mobility state of the communication device.

Embodiment 21 The method of any of Embodiments 14-20, wherein the AOD is a process to determine at least one of: a propagation delay; and a Doppler shift associated with the communication channel between the communication device and the network node.

Embodiment 22. The method of any of Embodiments 14-21, wherein the AOD is a global navigation satellite system, GNSS, AOD process.

Embodiment 23. The method of any of Embodiments 14-22, wherein communicating the information further comprises transmitting an indication to the communication device indicating one or more types of AOD processes that are allowed by the communication network.

Embodiment 24. The method of any of Embodiments 14-23, wherein communicating the information further comprises receiving an indication from the communication device indicating a type of AOD process that the communication device prefers to perform.

Embodiment 25. A communication device (800) configured to operate in a non-terrestrial network that includes a network node communicatively coupled to the communication device via a satellite, the communication device comprising:

processing circuitry (803); and memory (805) coupled to the processing circuitry and having instructions stored therein that are executable by the processing circuitry to cause the communication device to perform operations comprising:

determining (1110) when to perform an access offset determination, AOD, relative to a paging occasion, PO; and communicating (1120) information associated with the AOD to the network node.

Embodiment 26. The communication device of Embodiment 24, the operations further comprising any of the operations of Embodiments 2-13.

Embodiment 27. A network node (900, 1000) configured to operate in a non-terrestrial network that includes a communication device communicatively coupled to the network node via a satellite, the network node comprising:

processing circuitry (903, 1003); and memory (905, 1005) coupled to the processing circuitry and having instructions stored therein that are executable by the processing circuitry to cause the network node to perform operations comprising:

communicating (1410) information with the communication device, the information associated with an access offset determination, AOD, to be performed by the communication device;

transmitting (1420) a page to the communication device;

responsive to transmitting the page, determining (1430) that a period of time associated with the information has elapsed since transmitting the page; and responsive to determining that the period of time has elapsed, retransmitting (1440) the page to the communication device.

Embodiment 28. The network node of Embodiment 27, the operations further comprising any of the operations of Embodiments 15-24.

Embodiment 29. A communication device (800) configured to operate in a non-terrestrial network that includes a network node communicatively coupled to the communication device via a satellite, the communication device adapted to perform operations comprising:

determining (1110) when to perform an access offset determination, AOD, relative to a paging occasion, PO; and communicating (1120) information associated with the AOD to the network node.

Embodiment 30. The communication device of Embodiment 29, further adapted to perform any of the operations of Embodiments 2-14.

Embodiment 31. A network node (900, 1000) configured to operate in a non-terrestrial network that includes a communication device communicatively coupled to the network node via a satellite, the network node adapted to perform operations comprising:

communicating (1410) information with the communication device, the information associated with an access offset determination, AOD, to be performed by the communication device;

transmitting (1420) a page to the communication device;

responsive to transmitting the page, determining (1430) that a period of time associated with the information has elapsed since transmitting the page; and responsive to determining that the period of time has elapsed, retransmitting (1440) the page to the communication device.

Embodiment 32. The network node of Embodiment 31, further adapted to perform any of the operations of Embodiments 15-24.

Embodiment 33. A computer program comprising program code to be executed by processing circuitry (803) of a communication device (800) configured to operate in a non-terrestrial network that includes a network node communicatively coupled to the communication device via a satellite, whereby execution of the program code causes the communication device to perform operations comprising:

determining (1110) when to perform an access offset determination, AOD, relative to a paging occasion, PO; and communicating (1120) information associated with the AOD to the network node.

Embodiment 34. The computer program of Embodiment 33, the operations further comprising any of the operations of Embodiments 2-14.

Embodiment 35. A computer program comprising program code to be executed by processing circuitry (903, 1003) of a network node (900, 1000) configured to operate in a non-terrestrial network that includes a communication device communicatively coupled to the network node via a satellite, whereby execution of the program code causes the network node to perform operations comprising:

communicating (1410) information with the communication device, the information associated with an access offset determination, AOD, to be performed by the communication device;

transmitting (1420) a page to the communication device;

responsive to transmitting the page, determining (1430) that a period of time associated with the information has elapsed since transmitting the page; and responsive to determining that the period of time has elapsed, retransmitting (1440) the page to the communication device.

Embodiment 36. The computer program of Embodiment 35, the operations further comprising any of the operations of Embodiments 15-24.

Embodiment 37. A computer program product comprising a non-transitory storage medium including program code to be executed by processing circuitry (803) of a communication device (800) configured to operate in a non-terrestrial network that includes a network node communicatively coupled to the communication device via a satellite, whereby execution of the program code causes the communication device to perform operations comprising:

determining (1110) when to perform an access offset determination, AOD, relative to a paging occasion, PO; and communicating (1120) information associated with the AOD to the network node.

Embodiment 38. The computer program product of Embodiment 37, the operations further comprising any of the operations of Embodiments 2-14.

Embodiment 39. A computer program product comprising a non-transitory storage medium including program code to be executed by processing circuitry (903, 1003) of a network node (900, 1000) configured to operate in a non-terrestrial network that includes a communication device communicatively coupled to the network node via a satellite, whereby execution of the program code causes the second network node to perform operations comprising:

communicating (1410) information with the communication device, the information associated with an access offset determination, AOD, to be performed by the communication device;

transmitting (1420) a page to the communication device;

responsive to transmitting the page, determining (1430) that a period of time associated with the information has elapsed since transmitting the page; and responsive to determining that the period of time has elapsed, retransmitting (1440) the page to the communication device.

Embodiment 40. The computer program product of Embodiment 39, the operations further comprising any of the operations of Embodiments 15-24.

Explanations for abbreviations from the above disclosure are provided below.

Abbreviation Explanation

3GPP 3rd Generation Partnership Project
5G 5th Generation
5GS 5G System
CN Core Network
CSI Channel State Information
DCI Downlink Control Information
DRX Discontinuous Reception
eDRX Extended DRX eMBB Evolved Mobile Broadband
eMTC Enhanced MTC
EPC Evolved Packet Core
EPS Evolved Packet System
gNB Radio base station in 5G/NR.
GEO Geostationary Earth Orbit
GNSS Global Navigation Satellite System
GPS Global Positioning System
IE Information Element
LEO Low Earth Orbit
LTE Long Term Evolution
LTE-M LTE-Machine Type Communication
MBB Mobile Broadband
MEO Medium Earth Orbit
NB-IoT Narrowband Internet of Things
mMTC Massive MTC
MTC Machine Type Communication
NR New Radio
NTN Non-terrestrial Network
PBCH Physical Broadcast Channel
PDCCH Physical Downlink Control Channel
PDSCH Physical Downlink Shared Channel
PO Paging Occasion
PRACH Physical Random Access Channel
RA Random Access
RACH Random Access Channel
RAN Radio Access Network
RO PRACH Occasion/RACH Occasion
RRC Radio Resource Control
RSRP Reference Signal Received Power
SID Study Item Description
SS Synchronization Signal
SSB SS/PBCH block including synchronization signals
  and physical broadcasting channel. Also referred to as
  Synchronization Signal Block.
TA Timing Advance
TAU Tracking Area Update
TR Technical Report
UE User Equipment
URLLC Ultra-Reliable Low-Latency Communication
UTC Coordinated Universal Time
WUS Wake-Up Signal
ZC Zadoff-Chu
Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 16:
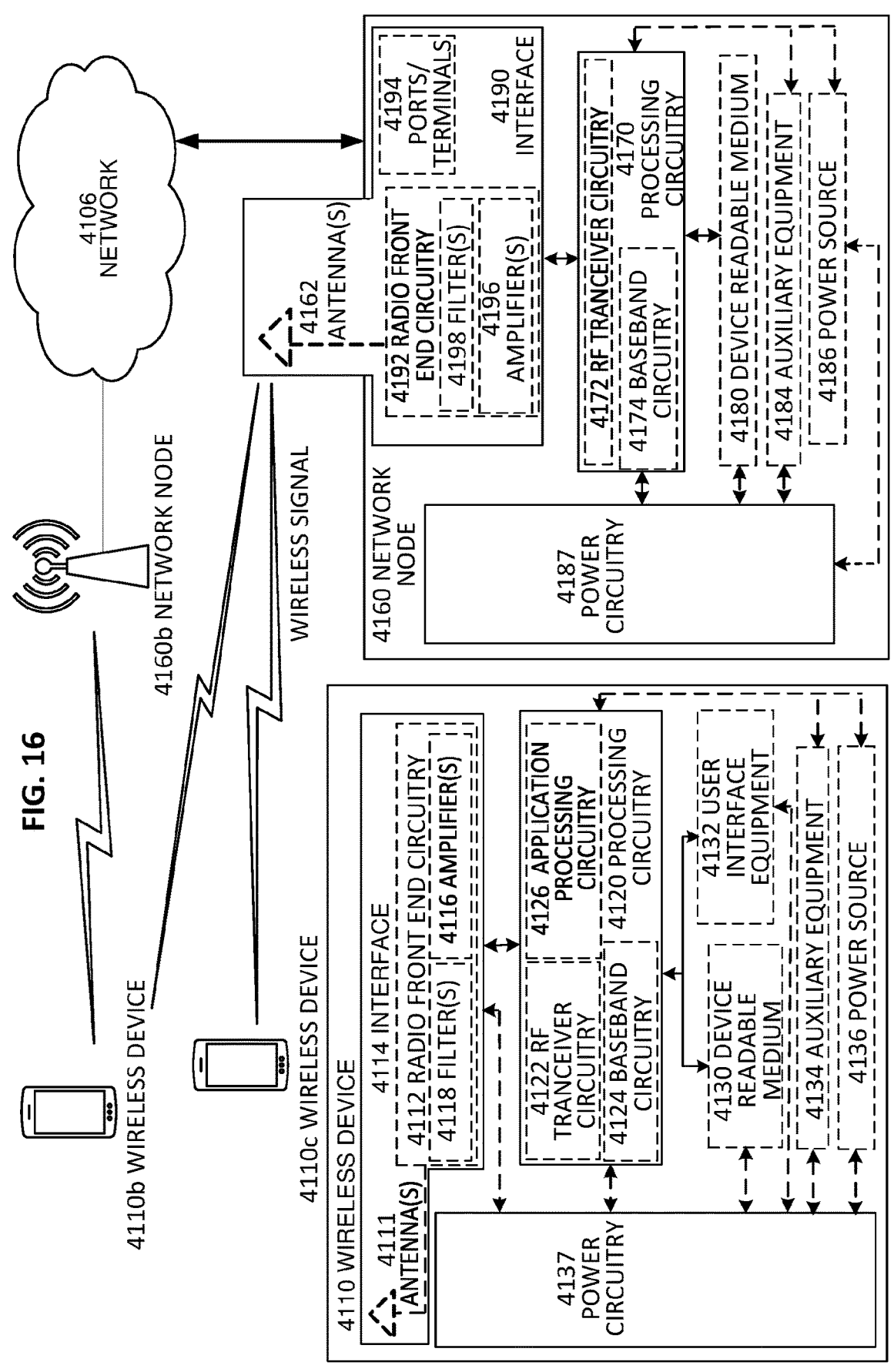
FIG. 16 is a block diagram of a wireless network in accordance with some embodiments.

FIG. 16 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as M IMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 16 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface

4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 17:
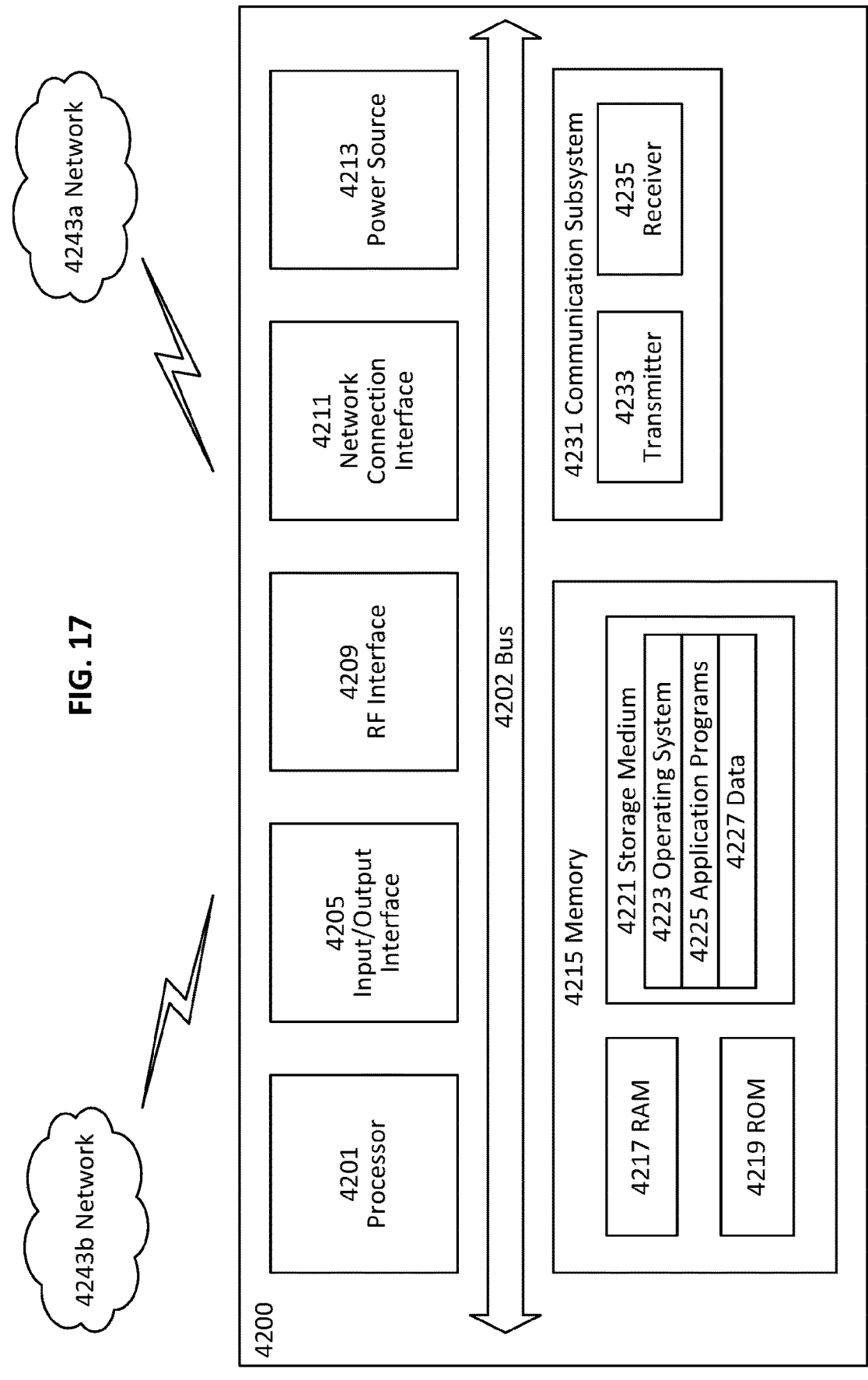
FIG. 17 is a block diagram of a user equipment in accordance with some embodiments

FIG. 17 illustrates a user Equipment in accordance with some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 17, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 17, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 18:
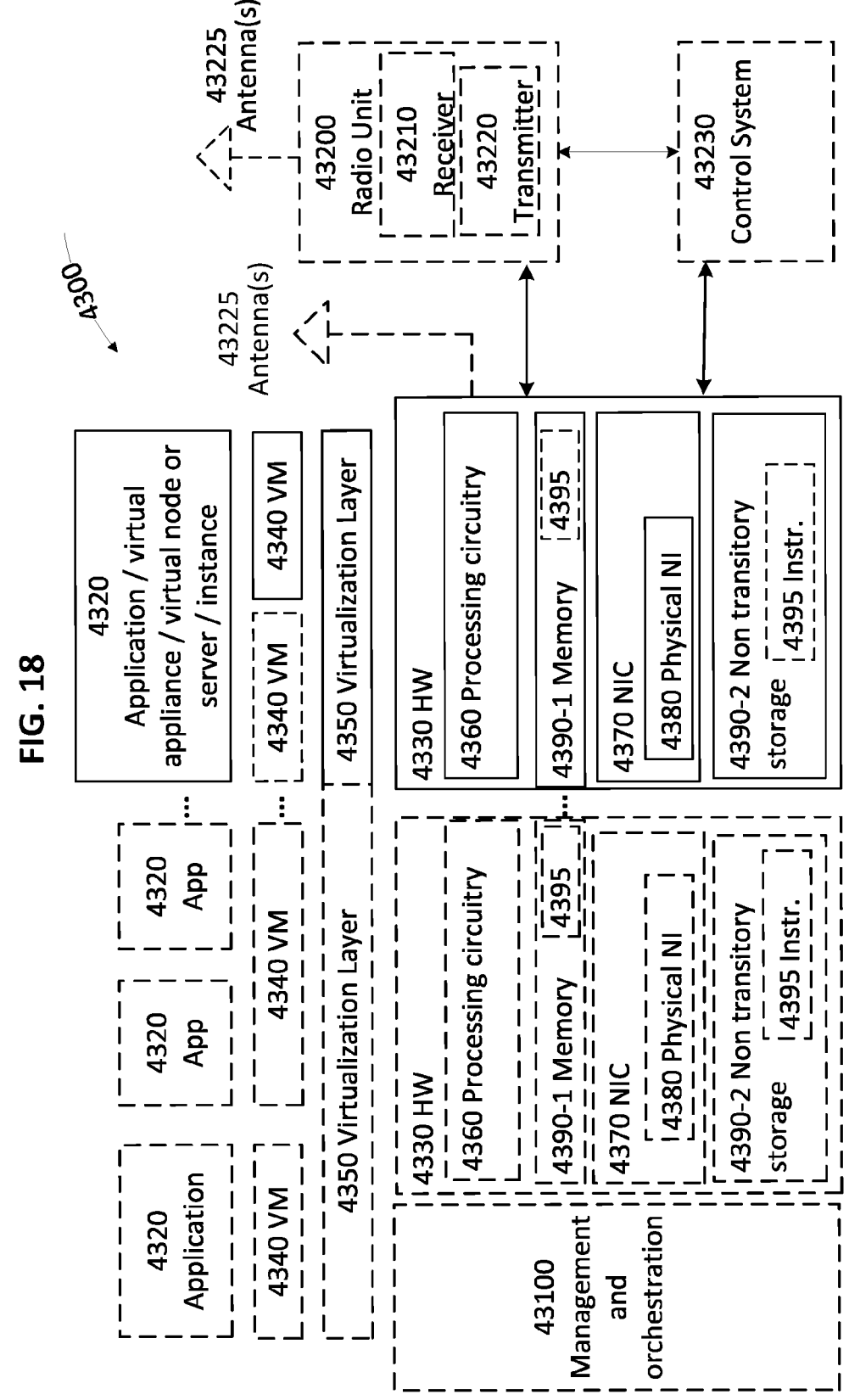
FIG. 18 is a block diagram of a virtualization environment in accordance with some embodiments.

FIG. 18 illustrates a virtualization environment in accordance with some embodiments.

FIG. 18 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 18, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 18.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 19:
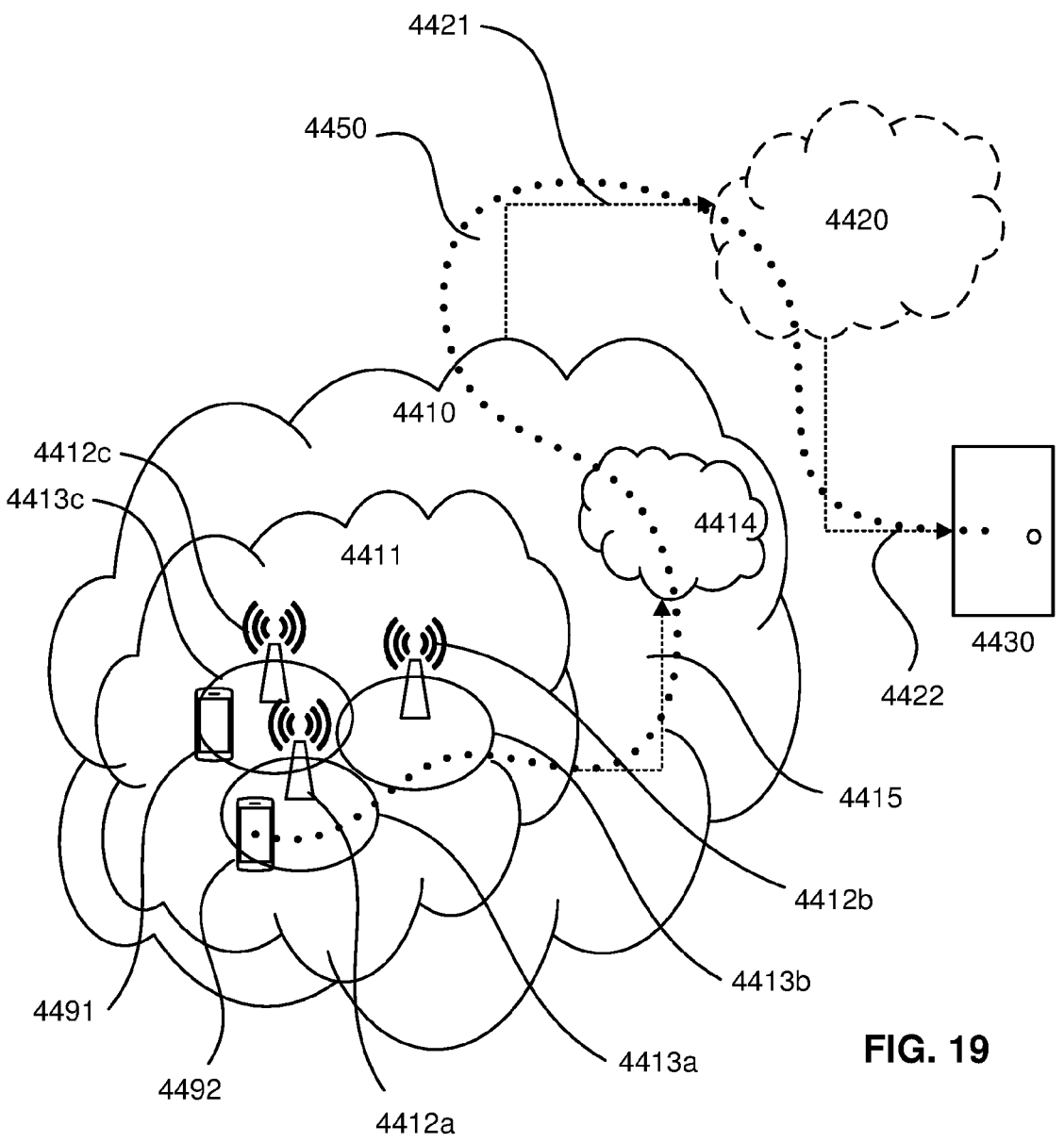
FIG. 19 is a block diagram of a telecommunication network connected via an intermediate network to a host computer in accordance with some embodiments.

FIG. 19 illustrates a telecommunication network connected via an intermediate network to a host computer in accordance with some embodiments.

With reference to FIG. 19, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 19 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 20:
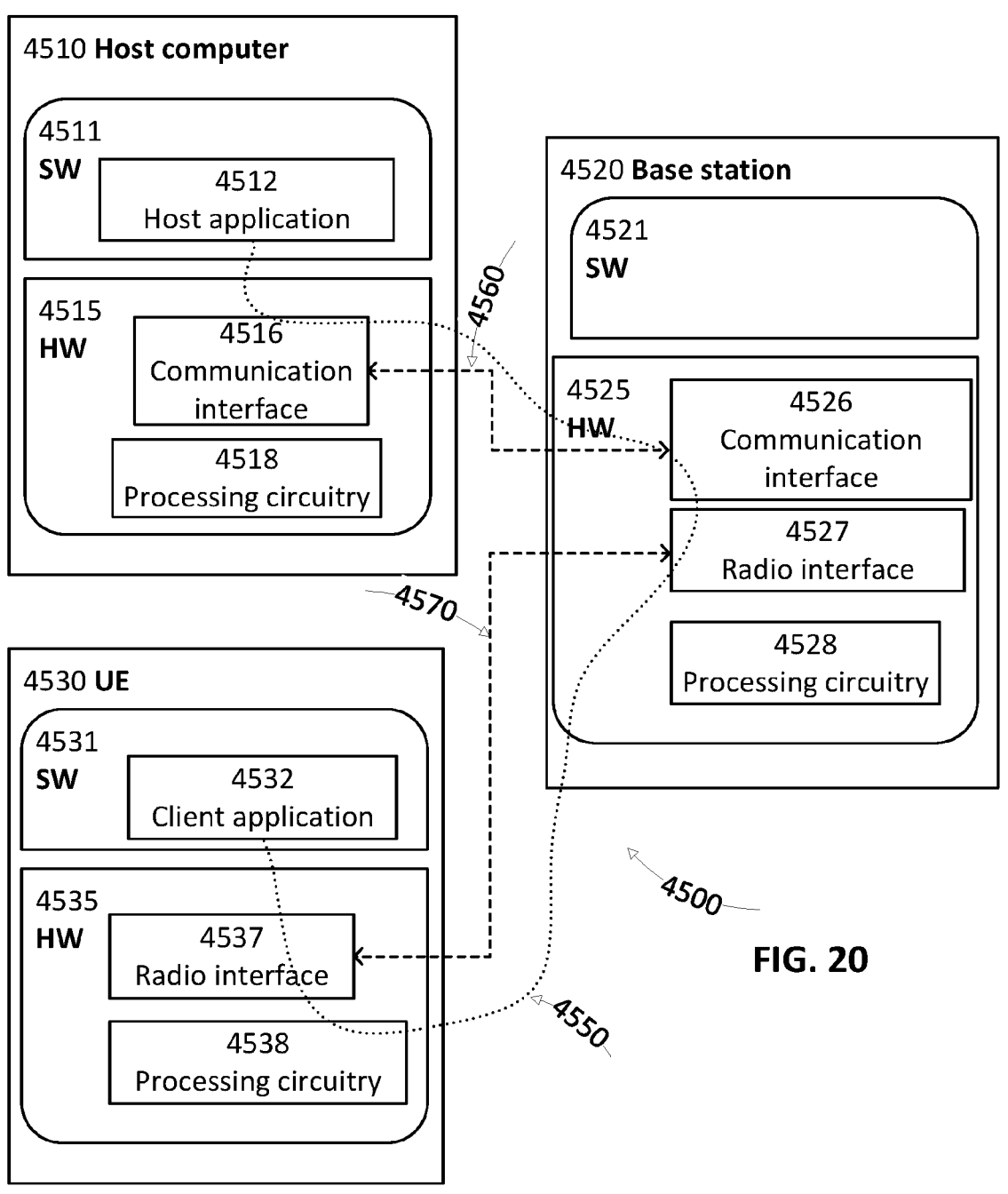
FIG. 20 is a block diagram of a host computer communicating via a base station with a user equipment over a partially wireless connection in accordance with some embodiments.

FIG. 20 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 20. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 20) served by base station 4520. Communication interface 4526 may be configured to facilitate connection 4560 to host computer 4510. Connection 4560 may be direct or it may pass through a core network (not shown in FIG. 20) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 20 may be similar or identical to host computer 4430, one of base stations 4412*a*, 4412*b*, 4412*c* and one of UEs 4491, 4492 of FIG. 19, respectively. This is to say, the inner workings of these entities may be as shown in FIG. 20 and independently, the surrounding network topology may be that of FIG. 19.

In FIG. 20, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 21, 22:
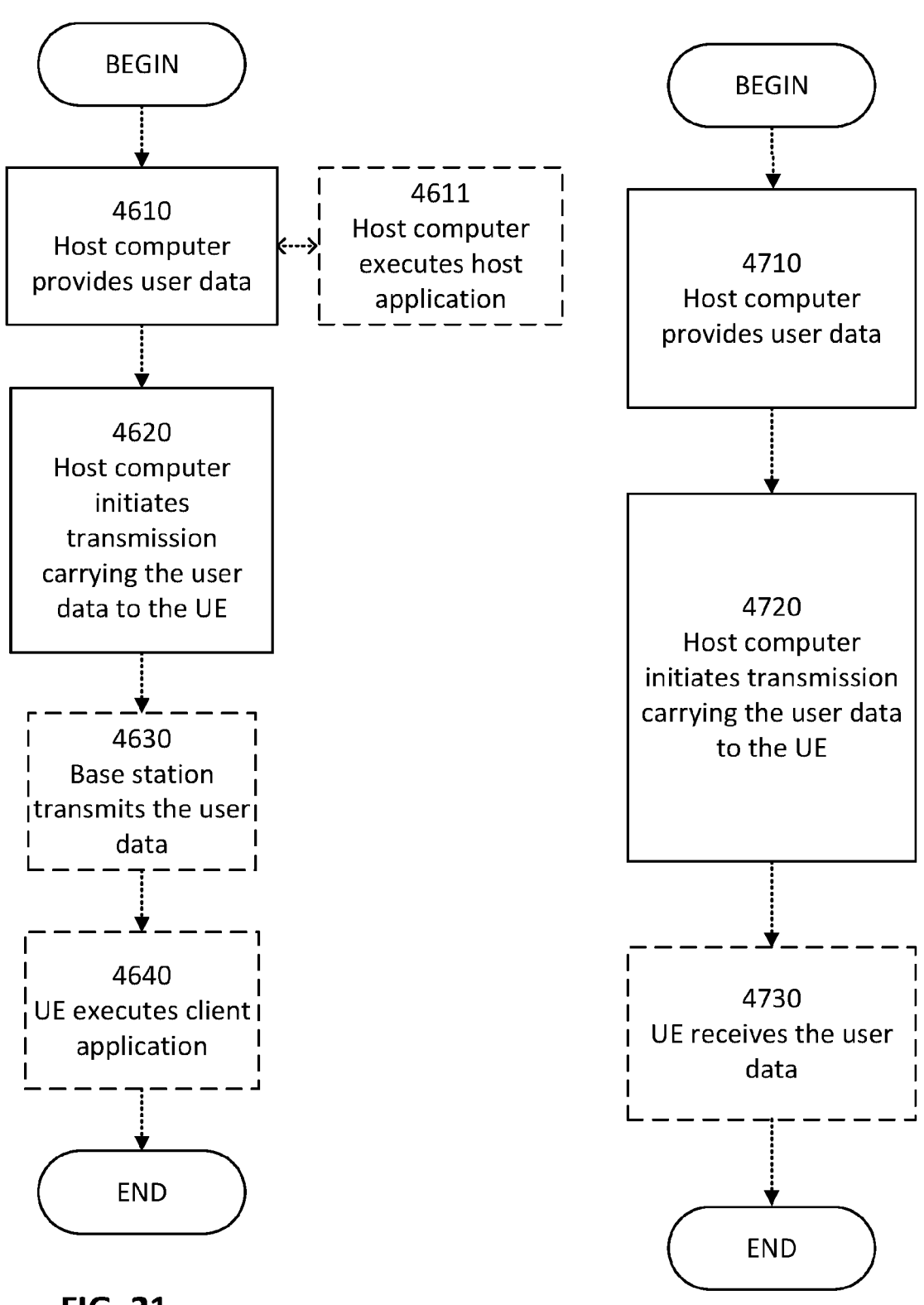
FIG. 21 is a block diagram of methods implemented in a communication system including a host computer, a base station, and a user equipment in accordance with some embodiments.
FIG. 22 is a block diagram of methods implemented in a communication system including a host computer, a base station, and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 21 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 22 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figures 23, 24:
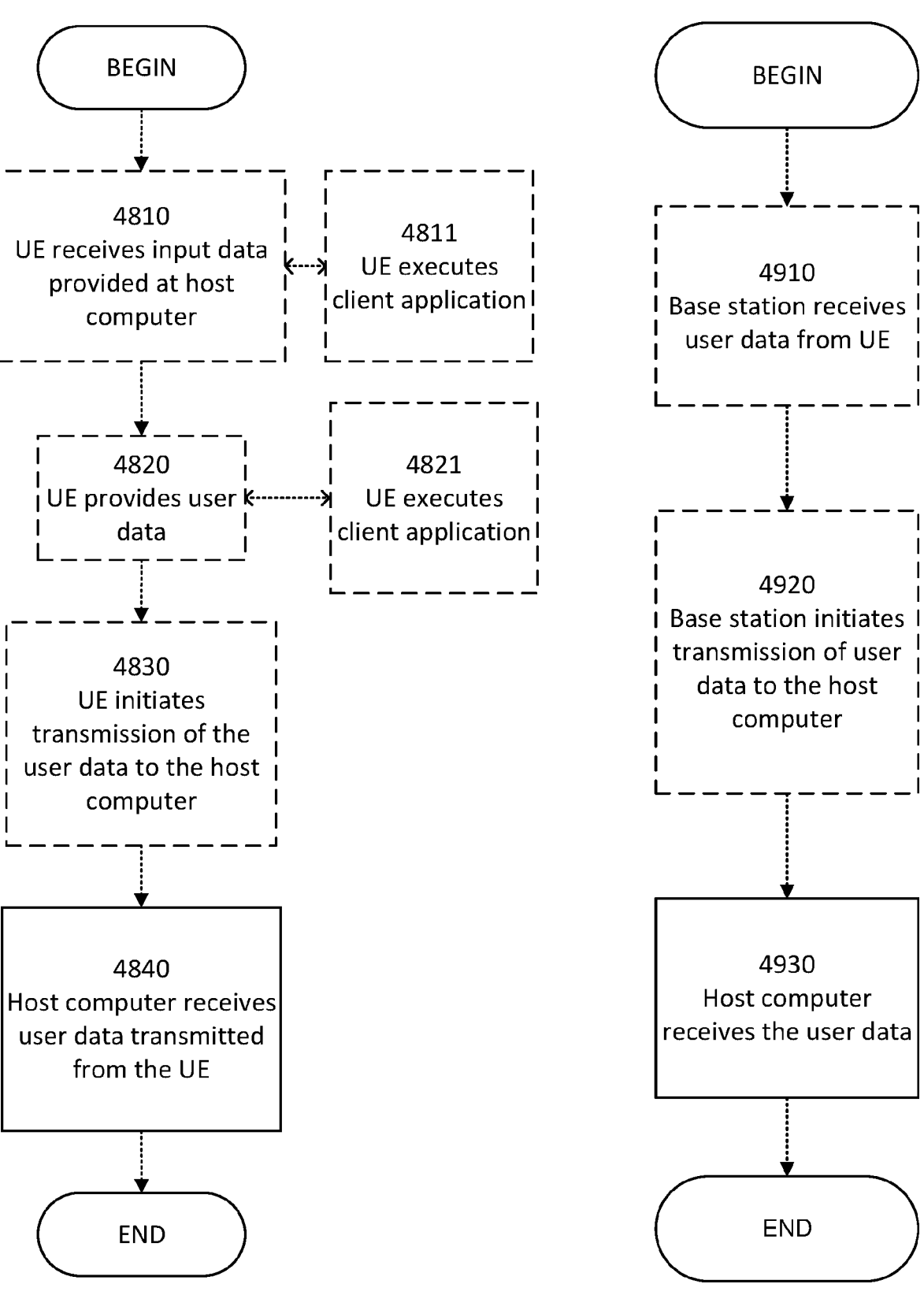
FIG. 23 is a block diagram of methods implemented in a communication system including a host computer, a base station, and a user equipment in accordance with some embodiments.
FIG. 24 is a block diagram of methods implemented in a communication system including a host computer, a base station, and a user equipment in accordance with some embodiments.

FIG. 23 illustrates methods implemented in a communication system including a host computer, a base station and a user equipment in accordance with some embodiments FIG. 23 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 23 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 24 illustrates methods implemented in a communication system including a host computer, a base station and a user equipment in accordance with some embodiments FIG. 24 is a flowchart illustrating a method implemented in a communication system, in accordance with one embodiment. The communication system includes a host computer, a base station and a UE which may be those described with reference to FIGS. 19-20. For simplicity of the present disclosure, only drawing references to FIG. 24 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device configured to operate in a non-terrestrial network that includes a network node communicatively coupled to the communication device via a satellite, the method comprising:

determining when to perform an access offset determination, AOD, relative to a paging occasion, PO, based on information associated with the AOD, the information comprising at least one of:

an indication of a first amount of time, TAOD, that the communication device currently requires to complete the AOD;

an indication of an amount of time, TAOD, VALID, that the communication device expects TAOD to be valid;

an indication of a second amount of time, TAOD,DEFAULT, that the communication device requires to complete the AOD as a default value;

an indication of an amount of time, TAOD,MAX, that the communication device is allowed to use for completing the AOD;

an indication of an amount of time, TFULL AOD,MAX, that the communication device is allowed to perform full access offset determination; or an indication of an amount of time, TPARTIAL AOD, MAX, that the communication device is allowed to perform partial access offset determination.

2. The method of claim 1, further comprising:

communicating information with the network node, the information associated with the AOD.

3. The method of claim 2, wherein communicating the information comprises transmitting the information to the network node, and wherein the information comprises at least one of: an indication of a first amount of time, TAOD, that the communication device currently requires to complete an AOD; an indication of an amount of time, TAOD, VALID, that the communication device expects TAOD to be valid; and an indication of a second amount of time, TAOD,DEFAULT, that the communication device requires to complete the AOD.

4. The method of claim 3, wherein transmitting the information comprises transmitting the information to the network node via a non-access stratum layer during an attach procedure.

5. The method of claim 3, wherein transmitting the information to the network node comprises determining the information based on a mobility state of the communication device.

6. The method of claim 2, wherein communicating the information comprises receiving at least one of an indication of an amount of time, TAOD,MAX, that the communication device is allowed to use for completing an access offset determination; an indication of an amount of time, TFULL_AOD,MAX, that the communication device is allowed to perform full access offset determination; and an indication of an amount of time, TPARTIAL_AOD,MAX, that the communication device is allowed to perform partial access offset determination.

7. The method of claim 2, wherein communicating the information comprises receiving an indication from the network node indicating one or more types of AOD processes that are allowed by the non-terrestrial network.

8. The method of claim 2, wherein communicating the information comprises transmitting an indication to the network node indicating a type of AOD process that the communication device prefers to perform.

9. The method of claim 1, further comprising:

periodically updating navigation information associated with the AOD after TAOD, VALID, wherein the information further comprises an indication that the communication device periodically updates the navigation information associated with the AOD after TAOD, VALID.

10. The method of claim 1, further comprising:

updating navigation information associated with the AOD; and responsive to updating the navigation information, transmitting an indication that the communication device has updated the navigation information to the network node.

11. The method of claim 1, wherein determining when to perform the AOD relative to the PO comprises determining to perform the AOD after the PO, the method further comprising:

receiving a page from the network node;

responsive to receiving the page, performing the AOD; and responsive to performing the AOD, transmitting a response to the page based on the AOD.

12. The method of claim 1, wherein the AOD is a process to determine at least one of: a propagation delay; and a Doppler shift associated with the communication channel between the communication device and the network node.

13. The method of claim 1, wherein the AOD is a global navigation satellite system, GNSS, AOD process.

14. A method of operating a network node configured to operate in a non-terrestrial network that includes a communication device communicatively coupled to the network node via a satellite, the method comprising:

transmitting a page to the communication device;

responsive to transmitting the page, determining that a period of time has elapsed since transmitting the page, the period of time being associated with information associated with an access offset determination, AOD, to be performed by the communication device; and responsive to determining that the period of time has elapsed, retransmitting the page to the communication device.

15. The method of claim 14, wherein the information comprises at least one of:

an indication of a first amount of time, TAOD, that the communication device currently requires to complete the AOD;

an indication of an amount of time, TAOD, VALID, that the communication device expects TAOD to be valid;

an indication of a second amount of time, TAOD,DEFAULT, that the communication device requires to complete the AOD as a default value;

an indication of an amount of time, TAOD,MAX, that the communication device is allowed to use for completing the AOD;

an indication of an amount of time, TFULL_AOD,MAX, that the communication device is allowed to perform full access offset determination; or an indication of an amount of time, TPARTIAL_AOD, MAX, that the communication device is allowed to perform partial access offset determination.

16. The method of claim 14, further comprising:

communicating the information with the communication device.

17. The method of claim 16, wherein communicating the information comprises receiving the information from the communication device, and wherein the information comprises at least one of: an indication of a first amount of time, TAOD, that the communication device currently requires to complete an AOD; an indication of an amount of time, TAOD, VALID, that the communication device expects TAOD to be valid; and an indication of a second amount of time, TAOD,DEFAULT, that the communication device requires to complete the AOD.

18. The method of claim 17, wherein receiving the information comprises receiving the information from the communication device via a non-access stratum layer during an attach procedure.

19. The method of claim 15, wherein the information further comprises an indication that the communication device periodically updates navigation information associated with the AOD after TAOD, VALID, and wherein the period of time is TAOD.

* * * * *